US 11,951,855 B2

(12) United States Patent
Lehn et al.

(10) Patent No.: US 11,951,855 B2
(45) Date of Patent: Apr. 9, 2024

(54) INTEGRATED THREE-PHASE AC CHARGER FOR VEHICLE APPLICATIONS WITH DUAL-INVERTER DRIVE

(71) Applicants: THE GOVERNING COUNCIL OF THE UNIVERSITY OF TORONTO, Toronto (CA); ELEAPPOWER LTD., Toronto (CA)

(72) Inventors: Peter Lehn, Toronto (CA); Philippe Gray, Stouffville (CA)

(73) Assignee: THE GOVERNING COUNCIL OF THE UNIVERSITY OF TORONTO ELEAPPOWER LTD., Toronto (CA)

( * ) Notice: Subject to any disclaimer, the term of this patent is extended or adjusted under 35 U.S.C. 154(b) by 0 days.

(21) Appl. No.: 18/124,357

(22) Filed: Mar. 21, 2023

(65) Prior Publication Data
US 2023/0234461 A1 Jul. 27, 2023

Related U.S. Application Data

(63) Continuation of application No. 17/272,219, filed as application No. PCT/CA2019/051225 on Aug. 30, 2019, now Pat. No. 11,607,965.
(Continued)

(51) Int. Cl.
*B60L 53/22* (2019.01)
*B60L 50/51* (2019.01)
(Continued)

(52) U.S. Cl.
CPC ............ *B60L 53/22* (2019.02); *B60L 50/51* (2019.02); *B60L 50/60* (2019.02); *B60L 53/24* (2019.02);
(Continued)

(58) Field of Classification Search
CPC .. B60L 53/22; B60L 2210/30; B60L 2220/54; H02M 1/14; H02M 5/4585; H02M 7/53871; H02P 27/08; H02J 2310/48
See application file for complete search history.

(56) References Cited

U.S. PATENT DOCUMENTS

2021/0146782 A1* 5/2021 Lehn ................ B60L 15/007
2021/0146792 A1* 5/2021 Lehn ................ B60L 58/22

FOREIGN PATENT DOCUMENTS

| JP | 2008219956 A | 9/2008 |
| JP | 2011155730 A | 8/2011 |
| WO | 201568300 A | 5/2015 |

OTHER PUBLICATIONS

Japanese Patent Office, Notice of Reasons for Rejection to JP 2021-510903, dated Jul. 18, 2023.

* cited by examiner

*Primary Examiner* — Jared Fureman
*Assistant Examiner* — Duc M Pham
(74) *Attorney, Agent, or Firm* — Norton Rose Fulbright Canada LLP

(57) ABSTRACT

A powertrain for electric and plug-in hybrid vehicle applications with integrated three-phase AC charging featuring buck-boost operation and optional vehicle-to-grid (V2G) capability, along with corresponding methods and machine instruction sets for switch control. The powertrain can include of a three-phase current source converter (CSC) front-end with an associated input filter, a polarity inversion module, and in an embodiment, a dual-inverter motor drive. The dual-inverter drive is the source of both the back emf and requisite DC inductance for the CSC. A compact design is thus provided as no additional magnetics are required and the on-board cooling system required for traction mode can be re-deployed for charging and V2G mode. The powertrain
(Continued)

is mode shifted between charging and V2G mode through an optional polarity inversion module.

20 Claims, 25 Drawing Sheets

Related U.S. Application Data

(60) Provisional application No. 62/725,711, filed on Aug. 31, 2018.

(51) Int. Cl.
    *B60L 50/60*     (2019.01)
    *B60L 53/18*     (2019.01)
    *B60L 53/24*     (2019.01)
    *B60L 55/00*     (2019.01)
    *H02M 1/14*     (2006.01)
    *H02M 5/458*     (2006.01)
    *H02M 7/5387*     (2007.01)
    *H02P 27/08*     (2006.01)

(52) U.S. Cl.
    CPC ............... *B60L 55/00* (2019.02); *H02M 1/14* (2013.01); *H02M 5/4585* (2013.01); *H02M 7/53871* (2013.01); *H02P 27/08* (2013.01); *B60L 53/18* (2019.02); *B60L 2210/30* (2013.01); *B60L 2210/40* (2013.01); *B60L 2210/42* (2013.01); *B60L 2220/12* (2013.01); *B60L 2220/54* (2013.01); *H02J 2310/48* (2020.01)

START
2402

PROVIDING A DUAL INVERTER DRIVE SYSTEM INCLUDING A UPPER CHARGING STAGE AND A LOWER CHARGING STAGE
2402

PROVIDING A CURRENT SOURCE CONVERTER (CSC) INCLUDING THREE CSC AC PHASE TERMINALS FOR COUPLING WITH THE AC GRID, A POSITIVE CSC DC TERMINAL COUPLED TO THE UPPER CHARGING STAGE AT A POSITIVE VSC1 DC TERMINAL, AND A NEGATIVE CSC TERMINAL COUPLED TO THE LOWER CHARGING STAGE AT A NEGATIVE VSC2 DC TERMINAL THE CSC INCLUDING A FIRST CIRCUIT LEG, A SECOND CIRCUIT LEG, AND A THIRD CIRCUIT LEG, EACH CIRCUIT LEG CORRESPONDING TO A CORRESPONDING CSC AC PHASE TERMINAL OF THE THREE CSC AC PHASE TERMINALS, EACH CIRCUIT LEG INCLUDING AT LEAST ONE UPPER SWITCH COUPLED TO A CORRESPONDING CSC AC PHASE TERMINAL AND THE POSITIVE CSC DC TERMINAL, AND AT LEAST ONE LOWER SWITCH COUPLED TO A CORRESPONDING CSC AC PHASE TERMINAL AND THE NEGATIVE CSC DC TERMINAL
2404

CONTROLLING, THROUGH GATE CONTROL SIGNALS, ENERGY FLOW BETWEEN THE AC GRID AND THE ELECTRIC VEHICLE OR THE HYBRID-ELECTRIC VEHICLE BY OPERATING THE UPPER AND LOWER SWITCHES WHICH WHEN ONLY ONE UPPER SWITCH IS IN AN ON-STATE, THAT SWITCH WILL CONDUCT A CURRENT EQUAL TO A SUM OF WINDING CURRENTS OF THE THREE OR MORE MOTOR WINDINGS, AND WHEN ONLY ONE LOWER SWITCH IS OPERATED, THAT SWITCH WILL CONDUCT A CURRENT EQUAL TO THE SUM OF THE WINDING CURRENTS
2406

END

FIG. 24

INTEGRATED THREE-PHASE AC CHARGER FOR VEHICLE APPLICATIONS WITH DUAL-INVERTER DRIVE

CROSS REFERENCE

This Application is a Continuation of U.S. application Ser. No. 17/272,219, which is a 371 US National Stage Application of PCT Application No. PCT/CA2019/051225 entitled "AN INTEGRATED THREE-PHASE AC CHARGER FOR VEHICLE APPLICATIONS WITH DUAL-INVERTER DRIVE" filed on Aug. 30, 2019, PCT/CA2019/051225 claims all the benefit, including priority to, U.S. Application No. 62/725,711, filed on Aug. 30, 2018, entitled "INTEGRATED BIDIRECTIONAL THREE-PHASE AC CHARGER FOR VEHICLE APPLICATIONS". All of the above Applications are incorporated by reference in their entirety.

FIELD

Embodiments disclosed herein generally relate to power electronics for electric and plug-in hybrid electric vehicle applications. More specifically, the embodiments relate to electric powertrains with integrated charging capability.

BACKGROUND

One of the bottlenecks to widespread adoption of electric vehicles is the time required to charge the on-board batteries. Generally, the power to charge the vehicle batteries is supplied from either a low-voltage single-phase alternating current (AC) grid, three-phase AC grid or direct current (DC) grid connection.

Unlike three-phase AC grids, low-voltage DC grids are not currently widely available; and compared to single-phase AC grids, three-phase AC grids generally have higher availability of power. Three-phase grid connections can be found where higher availability of power is required such as commercial buildings, office buildings and industrial facilities, for instance. Additionally, new three-phase ac grid connections can be made from existing three-phase distribution lines, for instance. Chargers for enabling three-phase AC charging can be either off-board or on-board the vehicle.

On-board integrated charger solutions are advantageous in that they have the potential to significantly reduce external infrastructure costs by integrating all power electronics onto the vehicles and levering existing on-board cooling systems.

The main disadvantages of integrated on-board chargers are the additional weight, volume, and cost to the vehicle, which are addressed by the presented solution.

SUMMARY

Electrical grid charging from DC sources is a simpler approach relative to charging by AC grid infrastructure, but not always available.

AC grid infrastructure is more readily available but conversion approaches have typically required expensive or cumbersome infrastructure elements for AC/DC conversion prior to use with an electric vehicle or a hybrid-electric vehicle. For example, a AC/DC conversion stage can be conducted by an additional rectifier circuit, which, in certain situations, utilize magnetic components to improve efficiency of power flow/energy transfer.

This type of AC/DC conversion stage adds infrastructure complexity (e.g., if required at every AC grid interface at electric car charging stations), and the magnetic components (e.g., inductors, capacitors) are both cumbersome (e.g., these components take up limited space at charging stations and are heavy) and expensive (e.g., additional inductors can be especially expensive).

Electric or hybrid-electric vehicles are desirable relative to conventional combustion engine vehicles due to reductions in harmful emissions. Combustion engines that utilize petrol or diesel can emit tons of carbon dioxide among other harmful emissions, such as methane, nitrous oxide that potentially contribute to climate change. Electric hybrid engines can be adapted to use potentially both gasoline/diesel and electric power stored therein.

Presently, electric vehicle adoption is limited by sparse availability of electric vehicle charging stations, as the cost and space requirements (e.g., limiting the number of stalls) for current electric car charging stations are high. Large distances between electric car charging stations or queuing due to less stalls than a number of vehicles to be charged can severely impact the viability of electric cars as electric vehicles only have limited range.

Accordingly, an improved approach for charging from an AC grid (e.g., a multi-phase AC grid) is desirable. The proposed approach is an improved circuit topology (and corresponding circuits, methods, and machine instruction sets stored on non-transitory machine readable media) that is directed to an environmental (green) technology that could help to resolve or mitigate environmental impacts by improving the viability of electric or hybrid vehicles. As the viability of electric or hybrid vehicles is improved, reliance on combustion engines can be reduced to help conserve natural environment and oil/gas resources.

The magnetic components of the electric motor, when not in use, can be leveraged for AC/DC conversion. A proposed approach described herein is directed to a electric powertrain circuit topology that includes a current source converter circuit that operates as an AC/DC conversion stage and couples to a dual inverter drive system that has two charging stages (e.g., an upper charging stage and a lower charging stage, which also can be referred to as a first charging stage and a second charging stage) that is connected across the motor (e.g., across motor windings). Because the dual inverter drive system connects through the motor itself, the magnetic components of the motor are used for the AC/DC conversion, providing a potentially less cumbersome and less expensive approach to AC/DC conversion. A stage is a circuit portion and includes physical electrical circuit components.

The electric powertrain circuit, in some embodiments, is provided as a component of the electric or hybrid vehicle and can, for example, reside on or within the electric or hybrid vehicle (e.g., as a circuit that is directly coupled to the motor and energy storage devices) such that the electric or hybrid vehicle can connect directly to three phase AC grid interfaces, even if the AC grid interface does not have an available AC/DC conversion stage, for example, when the electric or hybrid vehicle's motor is not being used for locomotion. An additional controller circuit can be provided that is configured to toggle operation of the open wound motor between a locomotion state and a energy flow state.

Further embodiments are described herein for polarity inversion such that the electric or hybrid vehicle is also able provide vehicle to grid (V2G) charging capabilities in different variant embodiments. Not all embodiments include vehicle to grid (V2G) charging capabilities—uni-directional charging from the AC grid to the electric or hybrid vehicle is contemplated in some embodiments. Alternatively, unidirectional charging to the AC grid from the electric or hybrid vehicle is also contemplated in other embodiments. V2G charging is useful, for example, in emergency situations, or situations where the grid is isolated and remote (e.g., a rural grid). Depending on grid electricity prices, it may also be economically advantageous to provide energy to the grid.

The dual inverter drive system includes a upper charging stage and a lower charging stage. Each of these stages has an energy storage and voltage source converter. For example, the upper charging stage has a first energy storage and a first voltage source converter (VSC1). The lower charging stage has a second energy storage and a second voltage source converter (VSC2). The dual inverter drive can be configured to provide voltage boosting capability, enabling power to be exchanged between the AC grid and the first or second energy storages when a sum of the energy storage voltages is greater than the maximum average rectified voltage across the CSC DC terminals.

An open wound motor (e.g., the motor that can be used for locomotion) is coupled between the first voltage source converter and the second voltage source converter, and the open wound motor has three or more motor windings. Each of these windings are coupled to a corresponding AC terminal of each of the first voltage source converter and the second voltage source converter.

The current source converter (CSC) includes three CSC AC phase terminals for coupling with the AC grid, a positive CSC DC terminal coupled to the upper charging stage at a positive VSC1 DC terminal, and a negative CSC terminal coupled to the lower charging stage at a negative VSC2 DC terminal.

The CSC includes a first circuit leg, a second circuit leg, and a third circuit leg. Each circuit leg corresponds to a corresponding CSC AC phase terminal of the three CSC AC phase terminals, and has at least one upper switch and one lower switch. The upper switches are each coupled to a corresponding CSC AC phase terminal and the positive CSC DC terminal. The lower switches are each coupled to a corresponding CSC AC phase terminal and the negative CSC DC terminal.

Each of the upper and lower switches are controlled by gate control signals, which when only one upper switch is in an on-state, that switch will conduct a current equal to the sum of the three winding currents, and when only one lower switch is operated, that switch will conduct a current equal to the sum of the three winding currents. These gate control signals control the energy flow between the AC grid and the electric vehicle/hybrid electric vehicle, exploiting the inductance of the motor to enable operation.

The CSC is a three-phase current source converter (CSC) front-end that can operate optionally, in another embodiment, together with an input filter which exploits the inductance of the motor to enable operation. The powertrain components provide a variable back emf and a series inductance to the CSC. The upper and the lower switches of the CSC can be configured in some embodiments such that both the real power and reactive power exchanged with the AC grid are separately controlled. The CSC can provide voltage bucking capability, enabling power to be exchanged between the AC grid and the first or second energy storages when a sum of the energy storages is less than the maximum average rectified voltage across the CSC DC terminals.

This re-use of the powertrain magnetics for the implementation of the integrated charger has three benefits: 1) no additional magnetic components are required which would otherwise add significant weight and volume to the charger; 2) motor cooling system is leveraged for cooling of the magnetics; and 3) the motor cooling system can be shared with the CSC front-end for cooling of the power electronic devices.

The energy storage elements are not restricted to being of a certain type nor are the energy storage elements required to be of identical type. Some examples of energy storage elements, include: batteries, fuel cells and super-capacitors. In an embodiment, one energy storage element can be of battery type and the other of super-capacitor type. Due to the particular arrangement of elements in an embodiment, the converter operates as a three-port converter during both charging and V2G modes. The emfs for each of the three ports are: 1) energy storage element 1; 2) energy storage element 2; and 3) the rectified AC grid voltage.

In an embodiment, the two independent energy storage elements connected on either side of the motor via inverters are electrically in series for charging and vehicle-to-grid mode. The ability to series connect the emfs is highly advantageous as the powertrain can realize higher dc-link voltages resulting in improved overall efficiency and increased charging power capability.

Another advantage to the use of a CSC for the front-end is that due to the inherent bi-directional blocking capability of the switches of the CSC, the charging currents for the energy storage elements are controllable irrespective of state of charge and nominal energy storage element voltages. The CSC can also feature fault-blocking capability, which ensures the energy storage elements are protected in the event of an AC grid fault (e.g., AC short circuit). The AC grid can be optionally coupled to the CSC through an input filter, the input filter configured to filter out harmonic currents generated by the electric powertrain from entering into the AC grid.

The structure of a CSC front-end together with a variable back emf provided by the differentially connected dual-inverter drive allows for buck-boost operation for charging which is also highly advantageous. In buck-mode, the CSC front-end steps down the grid voltage; and in boost-mode, the dual-inverter drive steps-up the grid voltage.

The charger is switched between charging and vehicle-to-grid mode through use of a polarity inversion circuit between the CSC and the dual-inverter drive. The role of the polarity inversion circuit is to invert the polarity of the DC-side back emf generated by the dual-inverter drive. Note, the polarity inversion circuit is optional, and included only in some embodiments. For example, the polarity inversion circuit is not needed if V2G operation is not required. The polarity inversion circuit can be coupled between the CSC and the upper charging stage and the lower charging stage such that the polarity inversion circuit is coupled to the CSC at the positive CSC DC terminal and the negative CSC DC terminal, and the polarity inversion circuit is coupled to the upper charging stage at the positive VSC1 DC terminal, and coupled to the lower charging stage at a negative VSC2 DC terminal. The polarity inversion circuit inverts a polarity of a back emf provided by the dual inverter drive such that the electric vehicle or the hybrid-electric vehicle is able to provide power to the AC grid.

In a first variant, the polarity inversion circuit is coupled to the upper charging stage at the negative VSC1 DC terminal and to the lower charging stage at a positive VSC2 DC terminal, and includes at least one switch and that interfaces the CSC with the dual inverter drive, with the polarity inversion circuit having a first state and a second state; the first state coupling the positive CSC DC terminal and the positive VSC1 DC terminal, and coupling the negative CSC DC terminal and the negative VSC2 DC terminal; and a second state coupling the positive CSC DC terminal and the negative VSC1 DC terminal, and coupling the negative CSC DC terminal and the positive VSC2 DC terminal; wherein the in the first state, power is directed to the electrical vehicle or the hybrid electric vehicle and the in the second state, power is directed to the AC grid.

In a second variant, the polarity inversion circuit includes at least one switch and interfaces the CSC with the dual inverter drive, with the polarity inversion circuit having a first state and a second state; the first state coupling the positive CSC DC terminal and the positive VSC1 DC terminal, and coupling the negative CSC DC terminal and the negative VSC2 DC terminal; and a second state coupling the positive CSC DC terminal and the negative VSC2 DC terminal, and coupling the negative CSC DC terminal and the positive VSC1 DC terminal; wherein the in the first state, power is directed to the vehicle and the in the second state, power is directed to the grid.

In either the first variant or the second variant, the polarity inversion circuit can include a mechanical switch of double pole single throw type or a switch of double pole double throw type. In either the first variant or the second variant, the polarity inversion circuit could alternatively consist of at least four semiconductor switches with each switch of the at least four semiconductor switches coupling one CSC DC terminal to one VSC DC terminal.

In a third variant, each phase of the CSC is associated with two switches, an upper switch corresponding to the phase and a lower switch corresponding to the phase, each of the upper switch and the lower switch corresponding to the phase comprising a first and a second series connected sub-switches with an accessible mid-point, the first sub-switch providing positive voltage blocking capability and the second sub-switch providing negative voltage blocking capability; and the polarity inversion circuit includes a first three phase switch network and a second three phase switch network, with each three phase switch network including at least four switches, three switches for each phase and one master switch that is to controllable; the positive CSC DC terminal and the positive VSC1 DC terminal are electrically bonded, and the negative CSC DC terminal and the negative VSC2 DC terminal are electrically bonded; and wherein the first three phase switch network couples the mid-point of the three upper sub-switches to the dual inverter drive; wherein the second three phase switch network couples the mid-point of the three lower sub-switches to the dual inverter drive; the polarity inversion circuit has a first state and a second state: in the first state, the first and second master control switches are controlled to be off and the first and second phase switch network are not active; in the second state, the first and second master control switches are controlled to be on and the first and second phase switch network are active.

In this variant, in the first state, power is directed to the vehicle; and in the second state, power is directed to the AC grid. The first three phase switch network can be coupled to the negative VSC1 DC terminal, and the second three phase switch network can be coupled to the positive VSC2 DC terminal. In a further variation, the first three phase switch network is coupled to the negative VSC2 DC terminal, and the second three phase switch network is coupled to the positive VSC1 DC terminal.

In another embodiment, a controller is provided that is configured to interleave the gating signals to the switches of the three or more phases of the first voltage source converter and to interleave the gating signals to the switches of the three or more phases of the second voltage source converter which can reduce the peak current ripple into the first or the second energy storages.

In another embodiment, a controller is configured to interleave the gating signals of the first and second voltage source converter switches which are coupled to the same motor winding; resulting in reduced peak current ripple in winding currents.

In another embodiment, a controller is configured to ensure the motor winding currents are DC and each of the motor winding currents are of equal DC value; resulting in no torque production in the open wound motor.

In another embodiment, a controller is configured to deliver different power to the first energy storage and the second energy storage such as when the two energy storage devices are at different voltages, the controller configured to provide the different power by adjusting a relative duty cycle of the upper switches of the first VSC with respect to a duty cycle of the lower switches of the second VSC.

Corresponding methods, processes, controller circuits (e.g., gate control circuits) and non-transitory machine readable media (storing instruction sets, which when executed by a processor, cause the processor to perform steps of a method) are contemplated. The non-transitory machine readable media can also store gate control sequences, which when transmitted to the switches, causes corresponding operation of the switches.

An electric or hybrid electric vehicle is contemplated which incorporates the powertrain descried in various embodiments. Similarly, a stand-alone CSC configured to couple to the other powertrain components is also contemplated, as well as a standalone power inversion circuit that is configured to couple to the other powertrain components (such as a CSC).

BRIEF DESCRIPTION OF THE DRAWINGS

FIG. 24 is a method diagram of a method for operating an integrated three-phase ac charger for vehicle applications with dual-inverter drive, according to some embodiments.

DETAILED DESCRIPTION

Electric or hybrid-electric vehicles are desirable relative to conventional combustion engine vehicles due to reductions in harmful emissions. Combustion engines that utilize petrol or diesel can emit tons of carbon dioxide among other harmful emissions, such as methane, nitrous oxide that potentially contribute to climate change. Electric hybrid engines can be adapted to use potentially both gasoline/diesel and electric power stored therein.

Electrical grid charging from DC sources is a simpler approach relative to charging by AC grid infrastructure, but not always available. AC grid infrastructure is more readily available but conversion approaches have typically required expensive or cumbersome infrastructure elements for AC/DC conversion prior to use with an electric vehicle or a hybrid electric vehicle. For example, a AC/DC conversion stage can be conducted by an additional rectifier circuit, which, in certain situations, utilize magnetic components to improve efficiency of power flow/energy transfer.

An example of AC grid infrastructure for charging can include supercharger stations, where a number of stalls are available for electric or hybrid electric vehicles to park, and to plug in a cable to charge. These supercharger stations are not as well distributed as conventional gasoline pumps for combustion engine vehicles, and can severely limit viability of electric or hybrid electric vehicles as the operating range of the electric or hybrid electric vehicles is typically less than that of a combustion engine vehicle having a full tank of gasoline or diesel.

An AC/DC conversion stage adds infrastructure complexity (e.g., if required at every AC grid interface at electric car charging stations), and the magnetic components (e.g., inductors, capacitors) are both cumbersome (e.g., these components take up limited space at charging stations and are heavy) and expensive (e.g., additional inductors can be especially expensive). Electric vehicle adoption is limited by sparse availability of electric vehicle charging stations, as the cost and space requirements (e.g., limiting the number of stalls) for current electric car charging stations are high. Large distances between electric car charging stations or queuing due to less stalls than a number of vehicles to be charged can severely impact the viability of electric cars as electric vehicles only have limited range.

Figure 1:
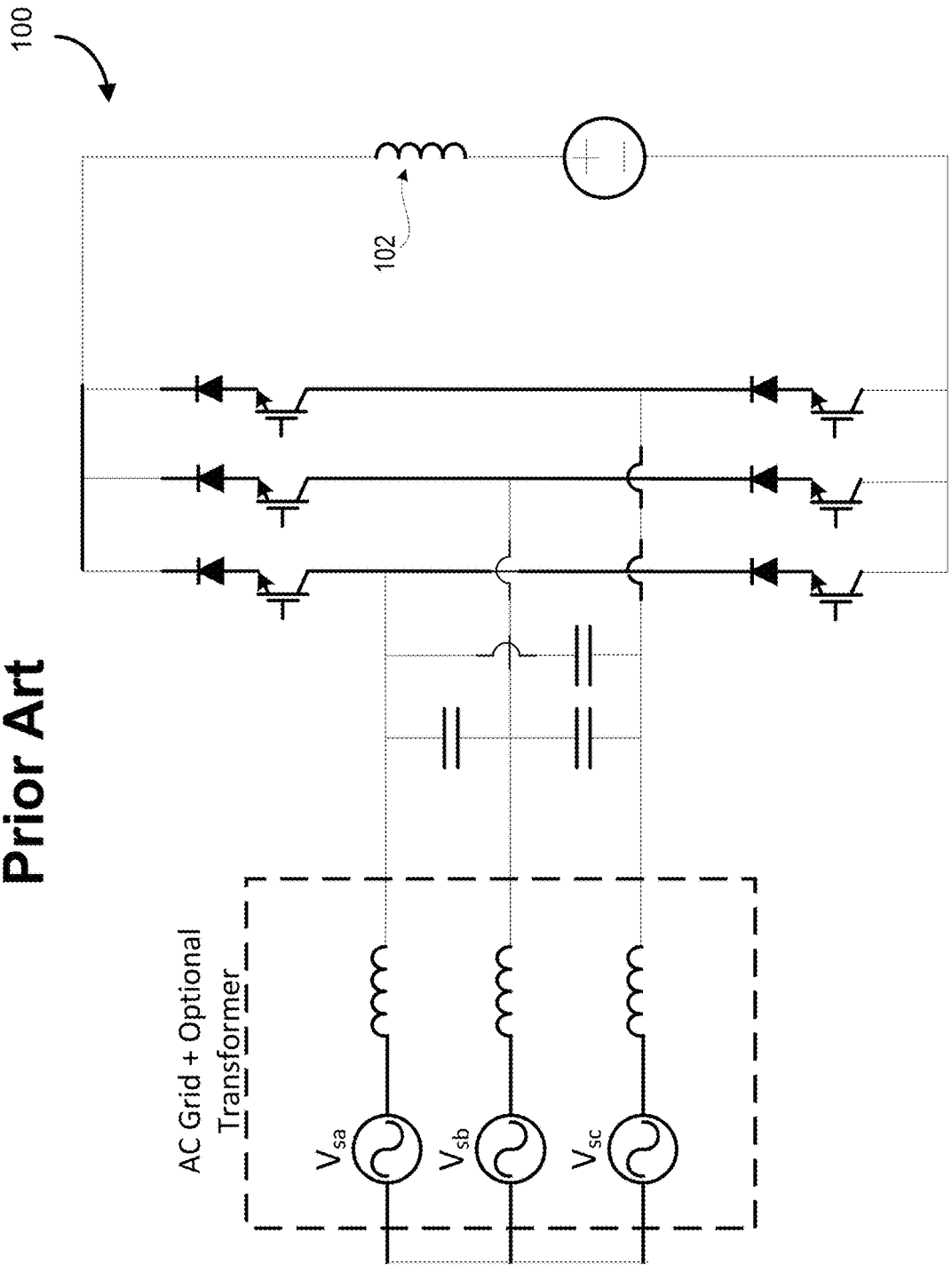
FIG. 1 presents a conventional current source converter in which the DC-link consists of an inductor and back emf source.

FIG. 1 presents a conventional current source converter 100 in which the DC link consists of an inductor and a back emf source. With this topology it is possible to charge an energy storage element, such as a battery, from a three-phase AC-grid.

A drawback to this solution when considering for electric vehicle (EV) applications, is that an external power inductor, $L_{dc}$ 102, is required adding significant cost, volume and weight to the charger. In addition, this topology does not address how to reverse the polarity of the emf source which is required for reversing the direction of power as required for V2G operating mode.

In Y. Han, M. Ranjram, and P. W. Lehn, "A bidirectional multi-port dc-dc converter with reduced filter requirements," in 2015 IEEE 16th workshop on control and modeling for power electronics (compel), 2015, pp. 1-6 [Han], a three-port DC/DC converter structure is described which allows for power exchange between three independent DC ports. For EV applications, this structure could be employed for managing power between a DC-link and two independent energy storage sources.

In R. Shi, S. Semsar, and P. W. Lehn, "Constant current fast charging of electric vehicles via a dc grid using a dual-inverter drive," IEEE Transactions on Industrial Electronics, vol. 64, no. 9, pp. 6940-6949, September 2017, an electric powertrain with integrated charging is described. This topology employs the structure in Han but with the integration of the powertrain components of the EV. The topology allows for fast on-board charging without additional magnetics. However, the charger is limited to DC grid charging applications and does not feature buck-boost charging capability. Therefore, a gap exists for integrated powertrain solutions for three-phase AC grid charging with buck-boost capability that re-utilize existing powertrain components to reduce weight, volume, and cost to the vehicle.

Accordingly, an improved approach for charging from an AC grid (e.g., a multi-phase AC grid) is desirable. The proposed approach is an improved circuit topology (and corresponding circuits, methods, and machine instruction sets stored on non-transitory machine readable media) that is directed to an environmental (green) technology that could help to resolve or mitigate environmental impacts by improving the viability of electric or hybrid vehicles. As the viability of electric or hybrid vehicles is improved, reliance on combustion engines can be reduced to help conserve natural environment and oil/gas resources.

Figure 2:
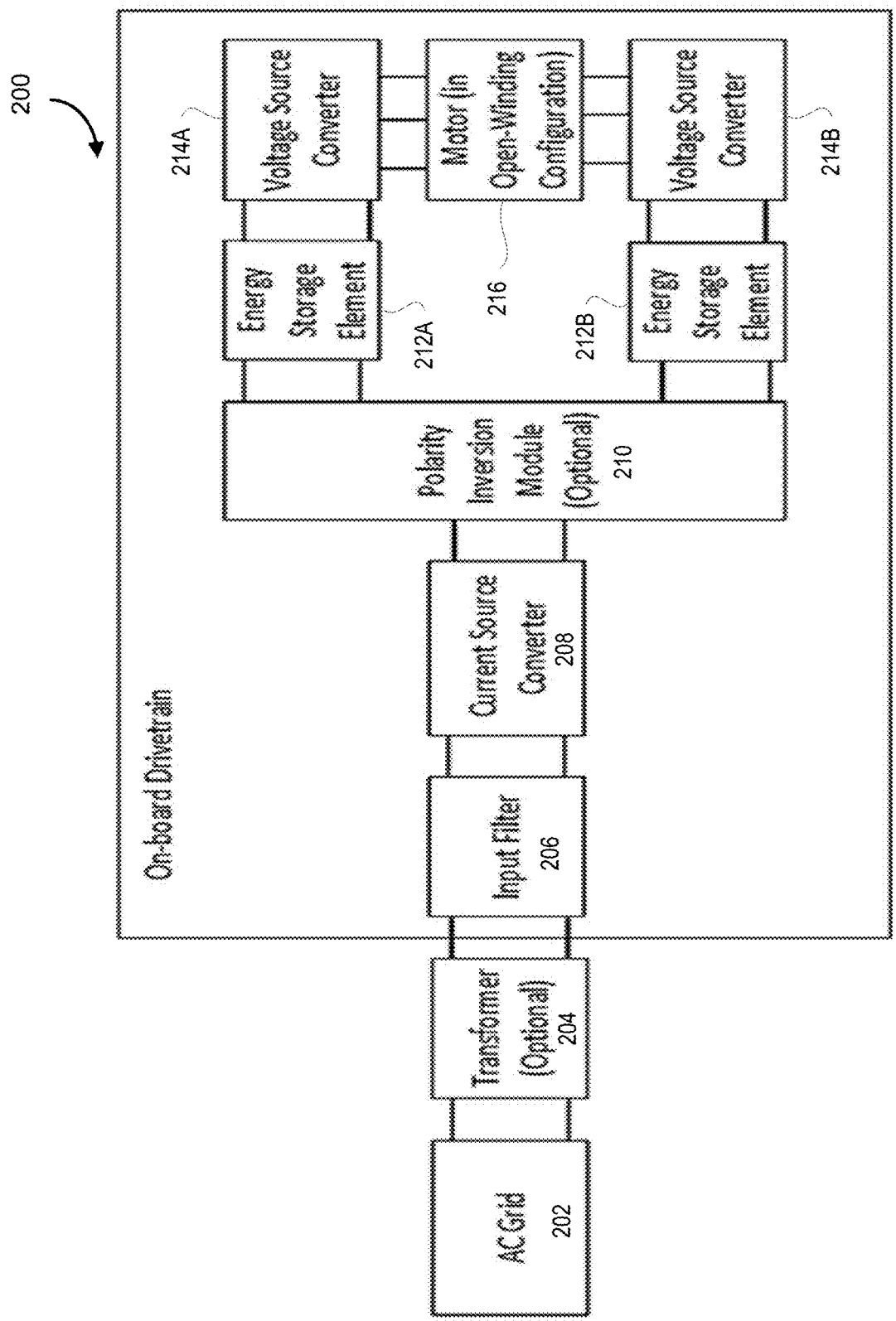
FIG. 2 is a high-level block diagram of some embodiments. The topology includes the following elements (from left to right): an optional interface power transformer, an input AC filter, a current source converter front-end, an optional polarity inversion module for reversing the power direction, two independent energy storage elements and a dual-inverter drive in which motor is in open-winding configuration.

The main elements of a preferred embodiment are presented in FIG. 2. The magnetic components of the electric motor, when not in use, can be leveraged for AC/DC conversion. Other embodiments are also contemplated.

The term module may be utilized in this description, and can include, in various embodiments, physical electrical circuits that include physical components, such as interface terminals, electrical pathways (e.g., wires), electrical nodes, resistors, semiconductors, switches, energy storage elements, reactive power elements, among others.

As shown in FIG. 2 at block schematic 200, an AC grid 202 and an optional transformer 204 connect to an on-board powertrain through input filter 206. The on-board powertrain includes a current source converter 208, and an optional polarity inversion module 210, which connects to two energy storage elements 212A, 212B that connect to a motor 216 through one voltage source converter each 214A, 214B.

The current source converter 208 is a circuit that operates as an AC/DC conversion stage and couples to a dual inverter drive system that has two charging stages (e.g., an upper charging stage and a lower charging stage) that is connected across the motor 216 (e.g., across motor windings). Because the dual inverter drive system connects through the motor 216 itself, the magnetics components of the motor are used for the AC/DC conversion, providing a potentially less cumbersome and less expensive approach to AC/DC conversion. Each of these stages has an energy storage and voltage source converter.

For example, the upper charging stage has a first energy storage and a first voltage source converter (VSC1). The lower charging stage has a second energy storage and a second voltage source converter (VSC2). The dual inverter drive can be configured to provide voltage boosting capability, enabling power to be exchanged between the AC grid and the first or second energy storage elements (equivalently termed energy storages) when a sum of the energy storage voltages is greater than the maximum average rectified voltage across the CSC DC terminals.

Note, in this disclosure traction inverter 1 is used interchangeably with voltage source converter 1 or VSC1.

Note, in this disclosure traction inverter 2 is used interchangeably with the terms voltage source converter 2 or VSC2.

The motor 216 can be an open wound motor (e.g., the motor that can be used for locomotion) that is coupled between the first voltage source converter and the second voltage source converter, and the open wound motor has three or more motor windings. Each of these windings are coupled to a corresponding AC terminal of each of the first voltage source converter and the second voltage source converter.

Figure 3:
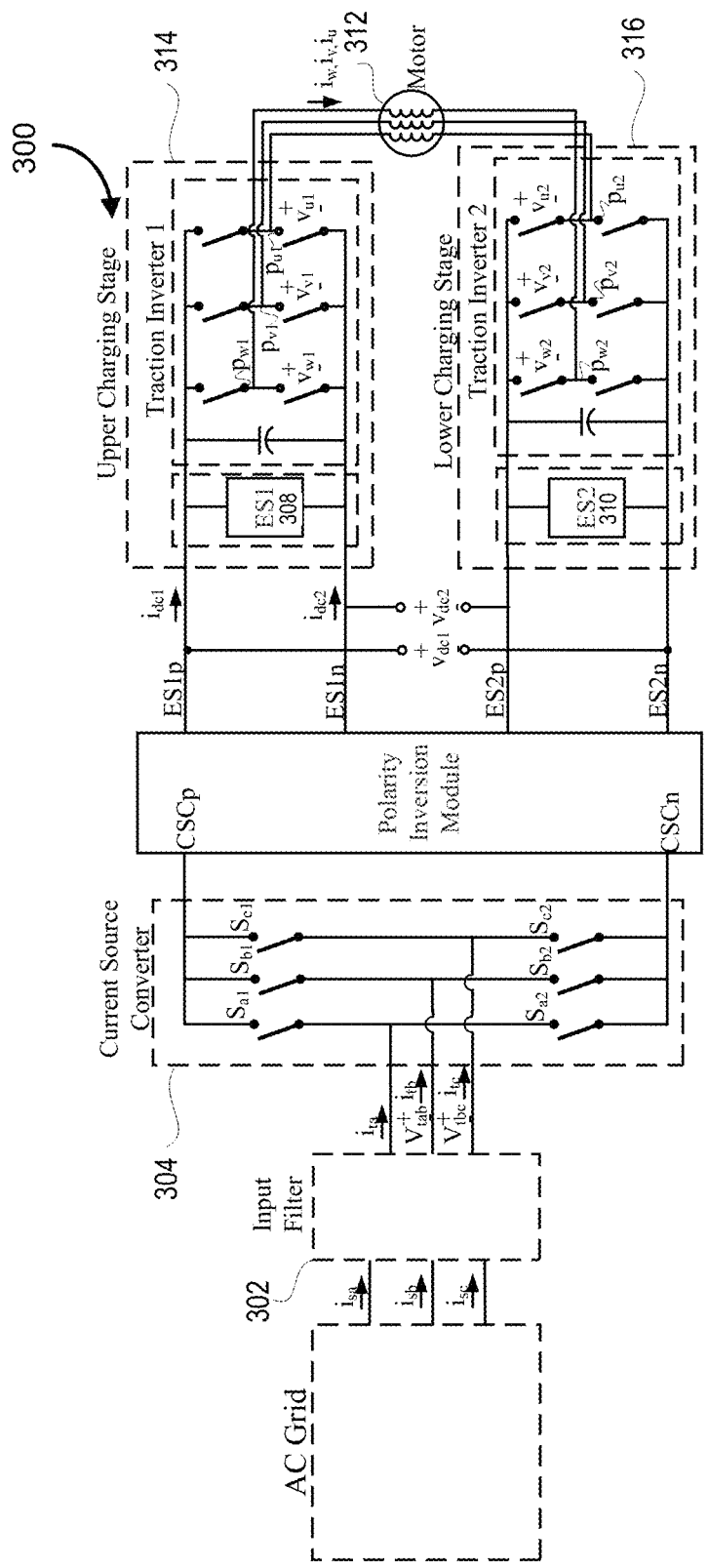
FIG. 3 is a more detailed representation of FIG. 2; where the current source converter, polarity inversion module, open-winding motor and drive inverters have been presented in more detail.
Figure 23:
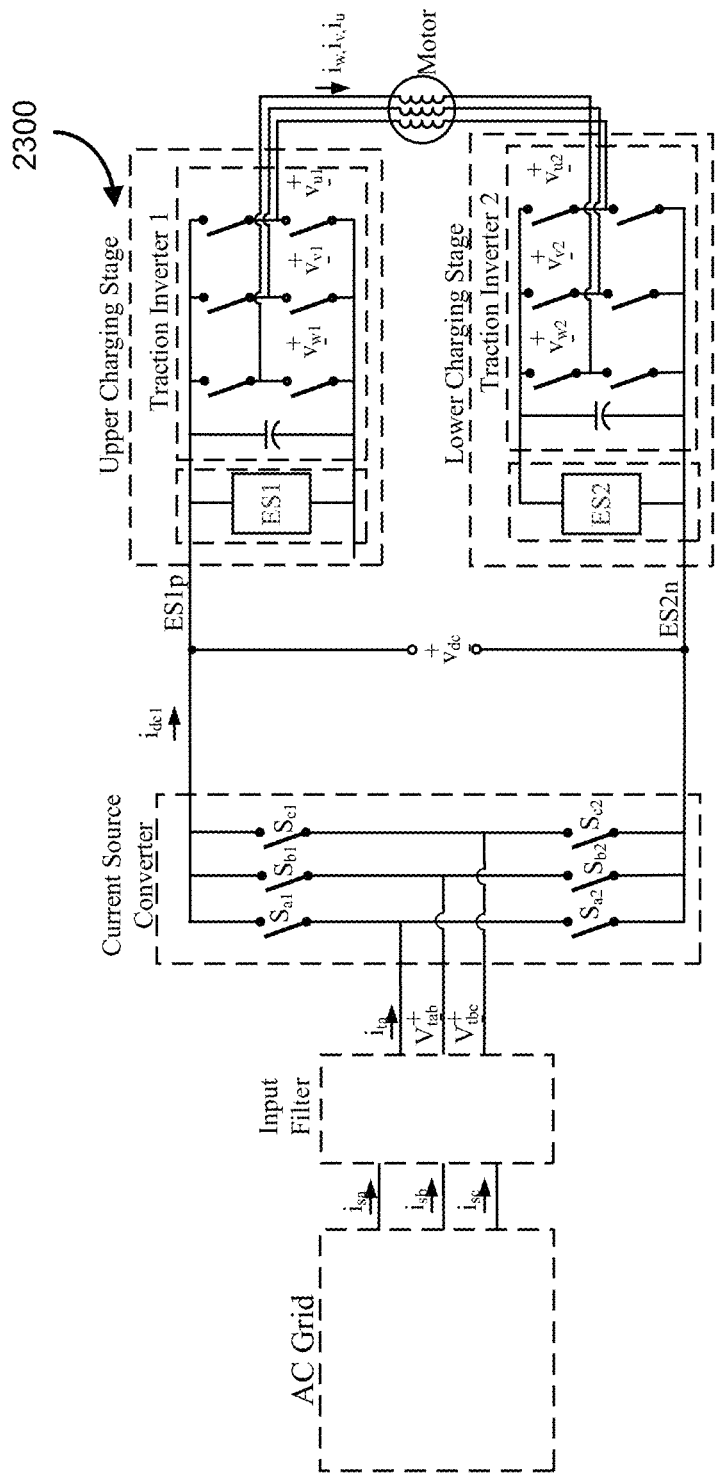
FIG. 23 presents a variation without bi-directional power capability, according to some embodiments.

An embodiment is detailed in FIG. 3, shown as circuit diagram 300. Four distinct embodiments of the polarity inversion module are presented in FIG. 4, FIG. 5, FIG. 6 and FIG. 7, shown in partial circuit diagrams 400, 500, 600, and 700, respectively. FIG. 23 shows an embodiment where there is no polarity inversion module present.

The electric powertrain elements located on-board the vehicle are shown in FIG. 3. The electric powertrain circuit, in some embodiments, is provided as a component of the electric or hybrid vehicle and can, for example, reside on or within the electric or hybrid vehicle (e.g., as a circuit that is directly coupled to the motor and energy storage devices) such that the electric or hybrid vehicle can connect directly to three phase AC grid interfaces, even if the AC grid interface does not have an available AC/DC conversion stage, for example, when the electric or hybrid vehicle's motor is not being used for locomotion. An additional controller circuit can be provided that is configured to toggle operation of the open wound motor between a locomotion state and a energy flow state. For example, the chassis of the electric or hybrid vehicle can be used as a housing for the electric powertrain circuit.

The on-board elements consist of a three-phase AC input filter 302, a three-phase CSC 304, a polarity inversion module 306, two energy storage elements 308, 310, and a dual-inverter drive 312. The dual inverter drive features two voltage source converters and an open wound motor.

First, the main elements of an embodiment are described. This is followed by a description of a means of operating various embodiments. Finally, simulation cases are presented which demonstrate the operation of the electric powertrain for a range of representative operating points.

Interface to Three Phase or Single Phase AC Grid

The electric powertrain can be charged and provide V2G services to both three-phase AC and single-phase AC grids, in accordance with various embodiments (not all embodiments necessarily provide V2G services). Uni-directional charging from the AC grid to the electric or hybrid vehicle is contemplated in some embodiments. Alternatively, uni-directional charging to the AC grid from the electric or hybrid vehicle is also contemplated in other embodiments.

A transformer between the vehicle and the AC grid may be required depending on local regulations regarding isolation and/or whether step-down or step-up of the AC grid connection voltage is required.

In this document, the term "AC grid" is used to refer to some general AC network. Therefore, in this context AC grid is not restricted to being just an electrical grid but also encompasses other types of AC network connections. V2G charging is useful, for example, in emergency situations, or situations where the grid is isolated and remote (e.g., a rural grid). Depending on grid energy prices, it may also be economically advantageous to provide energy to the grid.

Three Phase Input Filter

The three-phase AC input filter 302 is located between the AC-grid and the current source converter 304. The role of the input filter 302 is to attenuate the current harmonics generated by the current source converter front-end from entering into the AC grid. This attenuation is generally required in order to comply with local harmonic standards while operating the device in either charging or V2G mode. The input filter 302 can be realized in multiple ways including being either of passive or active type. Additionally, the input filter 302 can be located off the vehicle and/or it can be located between the AC-grid and the transformer rather than being between the transformer and the vehicle as is presented in FIG. 3.

Current Source Converter Front-End

The current source converter (CSC) 304 has a positive and negative DC terminal; wherein the positive and negative DC terminal are interfaced to the positive DC terminal of the first VSC 314 and the negative DC terminal of the second VSC 316.

The three AC terminals of the CSC are interfaced to the AC network through an optional input filter which provides filtering of harmonics.

The current source converter front-end (CSC) 304 functions by converting the line-side voltages across the low-pass AC filter into a voltage with a DC-component on the DC-side of the CSC. This conversion is realized through gating of the switches of the CSC 304.

This DC-side voltage drives a uni-directional current with a DC-component on the DC-side of the CSC 304. The gating of the switches, which generates the DC-side voltage, converts the three-phase AC-side currents into a DC-side current. The control of the gating signals allows the CSC 304 to control for quantities such as the real power and reactive power exchanged with the AC-grid when in charging mode or V2G mode, for instance.

The CSC 304 is also inherently fault tolerant ensuring the energy storage elements are protected in the event of an AC grid fault.

The CSC 304 includes a first circuit leg, a second circuit leg, and a third circuit leg. Each circuit leg corresponds to a corresponding CSC AC phase terminal of the three CSC AC phase terminals, and has at least one upper switch and one lower switch. The upper switches are each coupled to a corresponding CSC AC phase terminal and the positive CSC DC terminal. The lower switches are each coupled to a corresponding CSC AC phase terminal and the negative CSC DC terminal.

Each of the upper and lower switches are controlled by gate control signals, which when only one upper switch is in an on-state, that switch will conduct a current equal to the sum of the three winding currents, and when only one lower switch is operated, that switch will conduct a current equal to the sum of the three winding currents. These gate control signals control the energy flow between the AC grid and the electric vehicle/hybrid electric vehicle, exploiting the inductance of the motor to enable operation.

The powertrain components provide a variable back emf and a series inductance to the CSC. The upper and the lower switches of the CSC can be configured in some embodiments such that both the real power and reactive power exchanged with the AC grid are separately controlled. The CSC can provide voltage bucking capability, enabling power to be exchanged between the AC grid and the first or second energy storages when the sum of the energy storage voltages is less than the maximum average rectified voltage across the CSC DC terminals.

The two independent energy storage elements connected on either side of the motor via inverters can be electrically in series for charging and vehicle-to-grid mode. The ability to series connect the emfs is highly advantageous as the powertrain can realize higher dc-link voltages resulting in improved overall efficiency and increased charging power capability. Another advantage to the use of a CSC for the front-end is that due to the inherent bi-directional blocking capability of the switches of the CSC, the charging currents for the energy storage elements are controllable irrespective of state of charge and nominal energy storage element voltages. The CSC can also feature fault-blocking capability, which ensures the energy storage elements are protected in the event of an AC grid fault (e.g., AC short circuit). The AC grid can be optionally coupled to the CSC through an input filter, the input filter configured to filter out harmonic currents generated by the electric powertrain from entering into the AC grid.

The structure of a CSC 304 front-end together with a variable back emf provided by the differentially connected dual-inverter drive allows for buck-boost operation for charging which is also highly advantageous. In buck-mode, the CSC front-end steps down the grid voltage; and in boost-mode, the dual-inverter drive steps-up the grid voltage.

In an example embodiment, the CSC 304 consists of 6 switches labeled in FIG. 3 as $S_{a1}, S_{a2}, S_{b1}, S_{b2}, S_{c1}$ and $S_{c2}$.

Each leg of the CSC 304 contains two switches—one in the upper arm and one in the lower arm of the leg. An arm is defined as the path between a DC terminal and an AC phase terminal. A leg or CSC phase is defined as the path between the two DC-terminals of the CSC (i.e. between CSCp and CSCn).

In an example embodiment, each switch can require bi-polar voltage blocking capability and uni-directional current conduction capability. A combination of both active and passive semiconductor switches can be used to realize the CSC 304 in the preferred embodiment.

When the switches of the CSC feature bipolar voltage blocking capability enabling both the real power and reactive power exchanged with the AC grid to be separately controlled.

The CSC provides voltage bucking capability. This enables power to be exchanged between the grid and the energy storage elements when the sum of the energy storage element voltages is less than the maximum average rectified voltage across the CSC DC terminals.

The DC link current of the CSC is unidirectional in both charging and V2G mode in some embodiments. In an embodiment of the device with the polarity inversion module of FIG. 7, the DC link current during charging mode is the current that flows from the CSCp terminal to the CSCn terminal.

Figure 6:
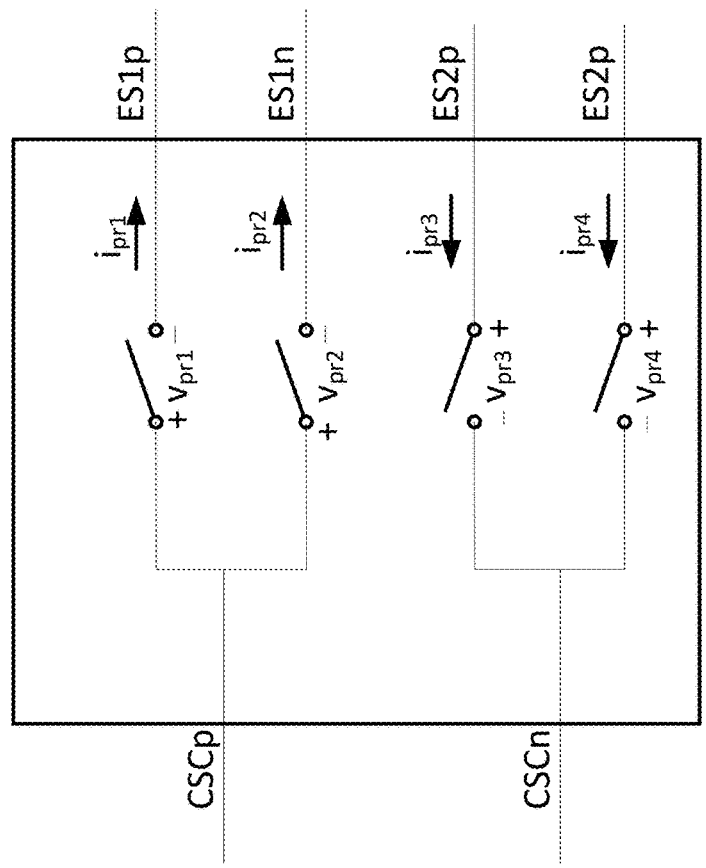
FIG. 6 presents a third embodiment of the polarity inversion module.
Figure 7:
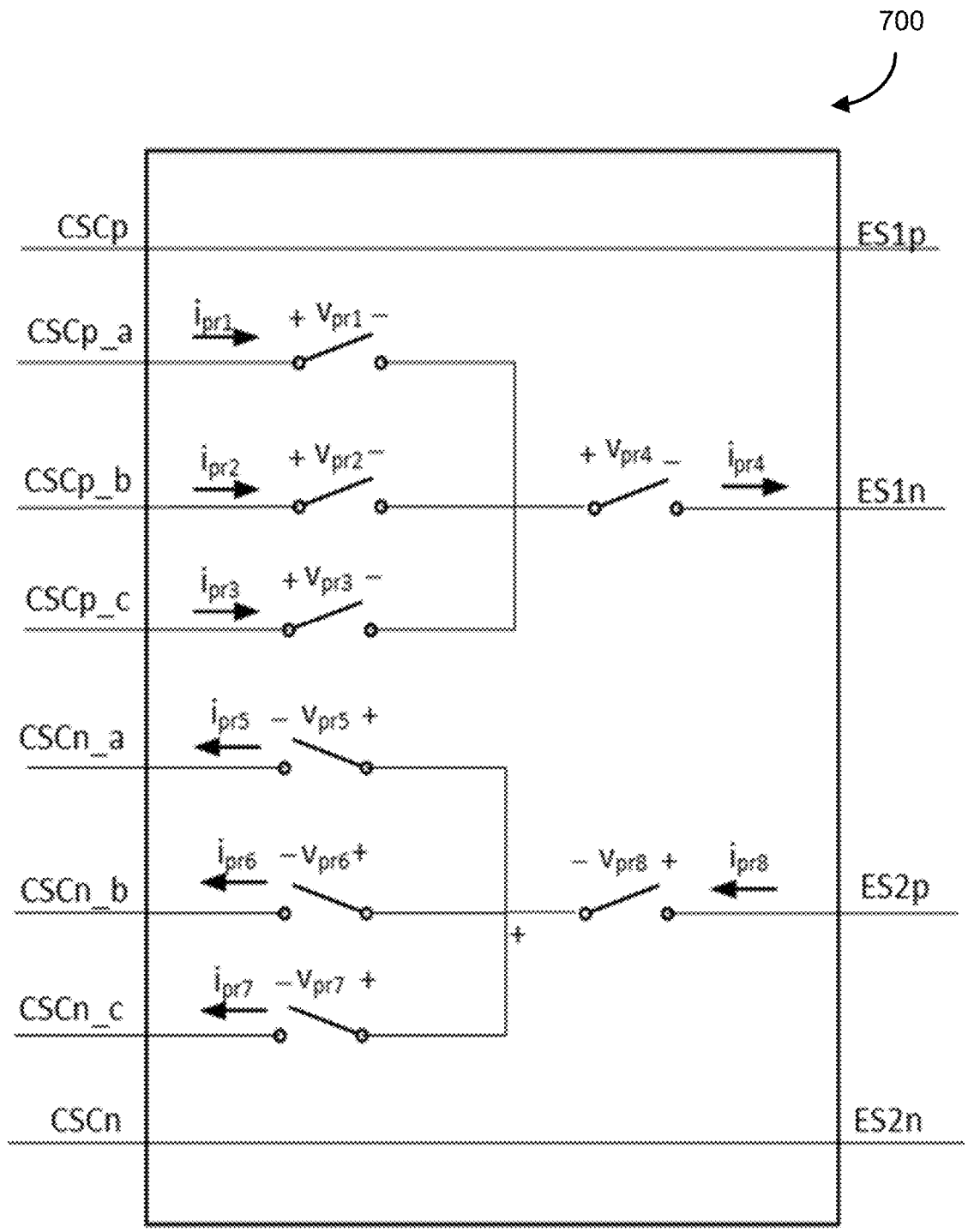
FIG. 7 presents a fourth and preferred embodiment of the polarity inversion module.

In an embodiment of the device with the polarity inversion module 700 of FIG. 7, the DC link current during V2G mode is the current that flows from the ES1n terminal to the ES2p terminal. In the polarity inversion module 400, 500, 600 of FIG. 4, FIG. 5 and FIG. 6, the DC link current during charging mode and discharge mode is the current that flows from CSCp terminal to the CSCn terminal.

If only one upper and one lower CSC switch are active then the current flowing into the upper switch will be equal to the DC link current and the current flowing into the lower switch will be equal to the DC link current. The DC link current is equal to the sum of the motor winding currents. This can be mathematically expressed as follows, $$i_{dc} = i_w + i_v + i_u$$

It is through controlling the states of the upper and lower switches of the CSC that the desired operation of the CSC is obtained.

In some embodiments of the current source converter there are 9 states in which only one upper and one lower switch are active. These states are summarized in the following Table along with the resulting phase currents $i_{ta}$, $i_{tb}$ and $i_{tc}$ at the input of the CSC for each of the 9 CSC states.

| State Number | Active Switches | $I_{ta}$ | $I_{tb}$ | $I_{tc}$ |
| --- | --- | --- | --- | --- |
| 1 | $S_{a1}$ and $S_{a2}$ are active | 0 | 0 | 0 |
| 2 | $S_{b1}$ and $S_{b2}$ are active | 0 | 0 | 0 |
| 3 | $S_{c1}$ and $S_{c2}$ are active | 0 | 0 | 0 |
| 4 | $S_{a1}$ and $S_{b2}$ are active | $i_{dc}$ | $-i_{dc}$ | 0 |
| 5 | $S_{a1}$ and $S_{c2}$ are active | $i_{dc}$ | 0 | $-i_{dc}$ |
| 6 | $S_{b1}$ and $S_{a2}$ are active | $-i_{dc}$ | $i_{dc}$ | 0 |
| 7 | $S_{b1}$ and $S_{c2}$ are active | 0 | $i_{dc}$ | $-i_{dc}$ |
| 8 | $S_{c1}$ and $S_{a2}$ are active | $-i_{dc}$ | 0 | $i_{dc}$ |
| 9 | $S_{c1}$ and $S_{b2}$ are active | 0 | $-i_{dc}$ | $i_{dc}$ |

As can be observed in the above Table, under ideal conditions the phase currents at the input of the CSC have the possibility of three values, 0, $i_{dc}$ or $-i_{dc}$ (where, $i_{dc}$ is the dc link current) depending on the states of the switches.

One approach for controlling the CSC is to use a space vector pulse with modulation technique or SVPWM. This is only one such technique of many that could be employed to control the CSC of some embodiments. With the SVPWM technique, in each switching period the CSC will undergo 3 of the 9 states, each for a specified duration. In the following paragraphs, the SVPWM as applied to some embodiments are described. This is however only one such control method and one such approach for implementing the SVPWM.

In this approach, it is the positive sequence component of the grid current that is controlled. The positive sequence current reference is a sinusoidal term which can be expressed as follows, $$Ip = |Ip|\cos(\theta)$$

Where Ip is the grid reference current where |Ip| is the magnitude of the reference and $\theta$ is the phase angle of the grid reference current. There are many ways to determine the reference current depending on the control objectives. For example, if it is desired to draw a certain real and reactive power from the grid, Ip can be approximated as follows, $$Ip = (P+jQ)^*/\text{sqrt}(3)/Vg+^*$$

Where, "*" denotes a complex conjugate and Vg+ is the positive sequence grid voltage component.

It is however convenient to re-express the reference current in terms of a modulation index and a phase angle. The result is as follows, $$m_i = |Ip|/I_{dc}$$

$$\theta = \theta_v + \theta_{ref}$$

Note, in some embodiments m, ranges from approximately 0 to 1 and $\theta$ ranges from approximately $-180$ to $+180$ degrees or equivalently 0 to 360 degrees.

There are different approaches to measure the positive sequence grid voltage phase angle, $\theta_v$. An example of one such approach is to use a phase lock loop (PLL).

The CSC undergoes three states per switching period. The set of three states that the CSC undergoes depends on the current reference angle, $\theta$. There are a total of 6 different sets of the three states. The range of a values in which the CSC features the same three states over a switching period are termed zones in this disclosure.

The zones and the corresponding CSC states are summarized in the below table,

| Zone (z) | $\theta$ (degrees) | State i | State ii | State iii |
| --- | --- | --- | --- | --- |
| 0 | $-30$ to $+30$ | 4 | 5 | 1 |
| 1 | 30 to $+90$ | 5 | 7 | 3 |
| 2 | 90 to 150 | 7 | 6 | 2 |
| 3 | 150 to 210 | 6 | 8 | 1 |
| 4 | 210 to 270 | 8 | 9 | 3 |
| 5 | 270 to $-30$ | 9 | 4 | 2 |

Where, state i, ii and iii denote the three states of the CSC for that particular zone. The states being defined in a previous Table. For instance, the 3 states corresponding to zone 4 are states 8, 9 and 3. The dwell times for states i, ii and iii (Ti, Tii and Tiii, respectively) can be approximated by the following formulae, $$T_i = m_i * \sin(30\deg - (\theta - z*60))$$

$$T_{ii} = m_i * \sin(30\deg + (\theta - z*60))$$

$$T_{iii} = 1 - T_i - T_{ii}$$

Where, z denotes a particular zone.

To cause three different converter states per switching period, 5 unique gating signals are employed in some embodiments which are distributed to the 6 switches of the CSC.

The 5 unique gating signals are described in the following table:

| | Low State Interval | High State Interval |
| --- | --- | --- |
| G1 | $t = T_i$ to $T_s$ | $t = 0$ to $T_i$ |
| G2 | $t = 0$ to $T_i$ and $t = T_i + T_{ii}$ | $t = T_i$ to $T_i + T_{ii}$ |
| G3 | $t = 0$ to $T_i + T_{ii}$ | $t = T_i + T_{ii}$ to $T_s$ |
| G4 | $t = 0$ to $T_s$ | — |
| G5 | — | $t = 0$ to $T_s$ |

Note,
$t = 0$ denotes the start of a switching period; and
$t = T_s$ denotes the end of a switching period.

Where, for instance, G1 corresponds to a low value (or equivalently off state) from $t=T_i$ to $T_s$; and G1 corresponds to a high value (or equivalently on state) from $t=0$ to $T_i$. Note, $T_s$ denotes a switching period.

The 5 gating signals are distributed to the CSC switches depending on the zone of operation. The distribution of the gating signals with respect to the zone of operation is summarized by the following Table,

| | Gating Signal | | | | |
| --- | --- | --- | --- | --- | --- |
| Zone | G1 | G2 | G3 | G4 | G5 |
| 0 | $S_{b2}$ | $S_{c2}$ | $S_{a2}$ | $S_{a1}$ | $S_{b1}, S_{c1}$ |
| 1 | $S_{a1}$ | $S_{b1}$ | $S_{c1}$ | $S_{c2}$ | $S_{a2}, S_{b2}$ |
| 2 | $S_{c2}$ | $S_{a2}$ | $S_{b2}$ | $S_{b1}$ | $S_{a1}, S_{c1}$ |
| 3 | $S_{b1}$ | $S_{c1}$ | $S_{a1}$ | $S_{a2}$ | $S_{c2}, S_{b2}$ |
| 4 | $S_{a2}$ | $S_{b2}$ | $S_{c2}$ | $S_{c1}$ | $S_{a1}, S_{b1}$ |
| 5 | $S_{c1}$ | $S_{a1}$ | $S_{b1}$ | $S_{b2}$ | $S_{c2}, S_{a2}$ |

Note the above is only one such example of an implementation of the control for the CSC and so other types of control would also be applicable.

It is the CSC that performs the bucking for this converter. Bucking is required in some embodiments, particularly in cases where the maximum average rectified voltage across the CSC DC terminals is greater than the total sum of the energy storage element 1 and energy storage element 2 voltages. Bucking in some embodiments is performed through adjusting the modulation index, mi.

By adjusting the modulation index, mi, the power delivered to the energy storage elements can be controlled in this case. By reducing the modulation index the power to the energy storage elements is reduced and by increasing the modulation index the power to the energy storage elements is increased in this case. The following is an approximate expression for the dc link current, $$I_{dc} = \left(\sqrt{3/2}\, V_{s,rms} m_i \cos(\theta) - V_d\right)/R$$

where, R is an equivalent resistance of the dc circuit and Vd is the back emf voltage provided by the dual-inverter drive.

Therefore, by reducing mi the dc link current, $I_{dc}$, will decrease. In buck mode, by maximizing Vd the dc link current is minimized for a fixed amount of power to be delivered to the vehicle, for instance.

Therefore in some embodiments, it is desired to maximize the back emf voltage of the dual inverter drive during buck mode charging. Therefore if $V_d$ is relatively fixed during buck mode, it is by adjusting the modulation index mi that the power to be exchanged can be controlled. Note, the a term also impacts the dc link current but its effect is, in some embodiments, is less than the modulation index term.

It should be noted, that in V2G mode, for a given reactive power, Q, delivered to the AC grid, the phase of the string currents will be phase shifted by 180 degrees in some embodiments. This phase shifting by 180 degrees can be performed in some embodiments by adjusting the theta term, $\theta_{ref}$.

Also as noted before, the positive sequence grid current reference, Ip=|Ip|cos($\theta_r$), has a phase angle term, θ. By adjusting a it is possible to adjust the reactive power delivered into the grid, Q. Note, Ip is related to related to Q by the following expression, $$Ip=(P+jQ)*/\mathrm{sqrt}(3)/Vg+*$$

By adjusting $\theta_r$ it is possible to adjust the value of Q.

Dual-Inverter Drive and Polarity Inversion Module

The charger is switched between charging and vehicle-to-grid mode through use of a polarity inversion circuit (e.g., polarity inversion module 306) between the CSC and the dual-inverter drive.

The role of the polarity inversion module 306 is to invert the polarity of the DC-side back emf generated by the dual-inverter drive. Note, the polarity inversion module 306 is optional, and included only in some embodiments.

The polarity inversion module 306 can be coupled between the CSC and the upper charging stage and the lower charging stage such that the polarity inversion module 306 is coupled to the CSC at the positive CSC DC terminal and the negative CSC DC terminal, and the polarity inversion module 306 is coupled to the upper charging stage at the positive VSC1 DC terminal, and coupled to the lower charging stage at a negative VSC2 DC terminal.

The CSC requires a back emf and a series inductance. The polarity inversion module 306 is configured to invert a polarity of a back emf provided by the dual inverter drive such that the electric vehicle or the hybrid-electric vehicle is able to provide power to the AC grid.

The back emf in conjunction with the rectified voltage of the CSC, sets the DC-side current. The series inductance attenuates the DC-side current ripple. The dual-inverter drive already on the vehicle provides this back emf and series inductance. The dual-inverter drive as seen in FIG. 3 consists of an open-winding motor 312 and two voltage source converters or inverters (voltage source converters are used in this document interchangeably with the term inverters) where each motor winding is differentially connected to the two inverters. Connected across the DC terminals of each inverter is an energy storage element 308 310.

The two voltage source converters (VSCs) have three or more phases; wherein each phase has an associated AC terminal; and each VSC has a positive and negative DC terminal which couple the VSC to one or more energy storage elements, i.e. traction inverter 1 to ES1 308 and traction inverter 2 to ES2 310.

The open-wound motor has three or more motor windings; wherein each of the motor winding has two terminals; wherein one motor winding terminal is interfaced to an AC terminal of a first VSC 314 and the second motor winding terminal is interfaced to an AC terminal of a second VSC 316. In this configuration, each of the motor windings is connected to one phase of the two inverters. The motor windings can each be modelled as inductors in this configuration. The inductance value is due to the leakage inductance of each of the motor windings in some embodiments. Therefore, there is a leakage inductance between the AC terminal of the first VSC and the AC terminal of the second VSC which are coupled to the same motor winding. For charging and V2G, this leakage inductance is a sufficient inductance in some embodiments such that no additional external inductance is required to be added to the powertrain.

The dual inverter drive provides voltage boosting capability. This enables power to be exchanged between the AC network and the energy storage elements when the sum of the energy storage element voltages is greater than the maximum average rectified voltage across the CSC DC terminals.

The polarity inversion module 306 interfaces the DC-terminals of the inverter to the DC-terminals of the CSC 304. The polarity inversion module 306 is configured such that the back emf provided by the two inverters 314 316 are of the same polarity for charging and V2G mode.

The polarity inversion module 306 enables a mode change between charging mode and V2G mode by inverting the polarity of the back emf provided by the dual-inverter drive, in an embodiment.

Therefore the CSC is coupled to the VSCs through a polarity inversion module enabling V2G operation. Note, if V2G operation is not required then the polarity inversion module can be omitted.

Description of Upper and Lower Charging Stage Elements

In an embodiment, the two inverters 314 316 of the charging stages each consist of 6 switches, 3 upper switches and 3 lower switches. Note that, the motor can have three phases, in some examples. Each of the switches requires bi-directional current conduction capability and uni-polar voltage blocking capability. An example implementation is IGBTs with anti-parallel diodes.

As can be observed in FIG. 3, both the energy storage elements as well as the polarity inversion module are connected in parallel to the DC capacitors of the inverters 314 316. The energy storage elements are independent and can be of different type and state-of-charge (or of the same).

For instance, energy storage element 1 308 can be of a battery type and energy storage element 2 310 can be of super-capacitor type. This flexibility allows for incorporation of higher power density elements for use in traction mode without an additional power electronic stage, for instance.

The gating of the upper and lower switches of the traction inverters are complementary in some embodiments. For example, when the upper switch for phase "w" is on in traction inverter 1 the lower switch for phase "w" is off in traction inverter 1.

Figure 14:
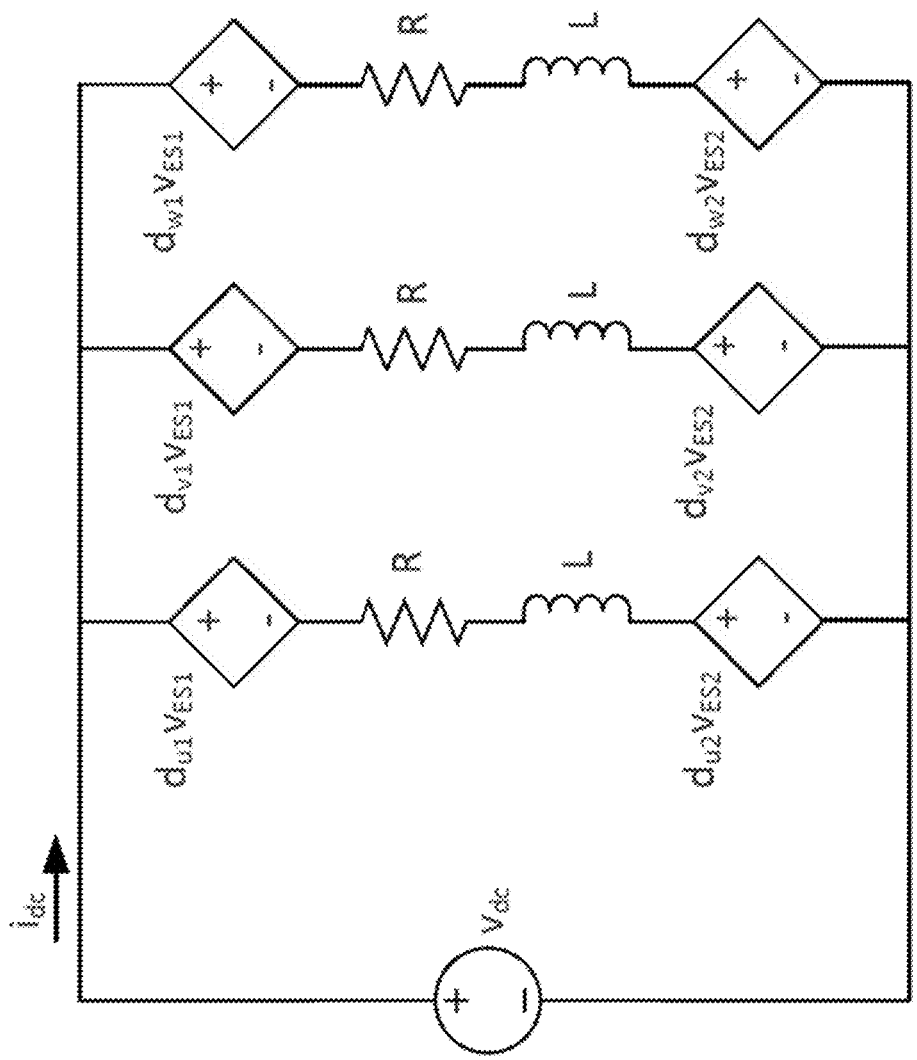
FIG. 14 presents a model of the DC-side of the integrated charger during charging mode.

Due to the differential connection of the dual inverter drive, the three phases of the traction inverter can be modelled as three separate branches as illustrated in diagram 1400 of FIG. 14. Each branch corresponds to one of the three phases of the dual-inverter drive in some embodiments, i.e., phase w, v and u.

In an embodiment, in charging mode, when the upper switch of the upper charging stage for phase "w" is on (or equivalently conducting or active), the ES1 is by-passed in that branch. Conversely, when the lower switch of the upper charging stage for phase "w" is on, the ES1 is inserted in that branch.

The principle applies to the other phases "v" and "u". Conversely, in charging mode when the upper switch of the lower charging stage for phase "w" is on (or equivalently conducting or active), the ES2 is inserted in that branch. And when the lower switch of the lower charging stage for phase "w" is, the ES2 is by-passed in that branch. The principle applies to the other phases "v" and "u".

Figure 11:
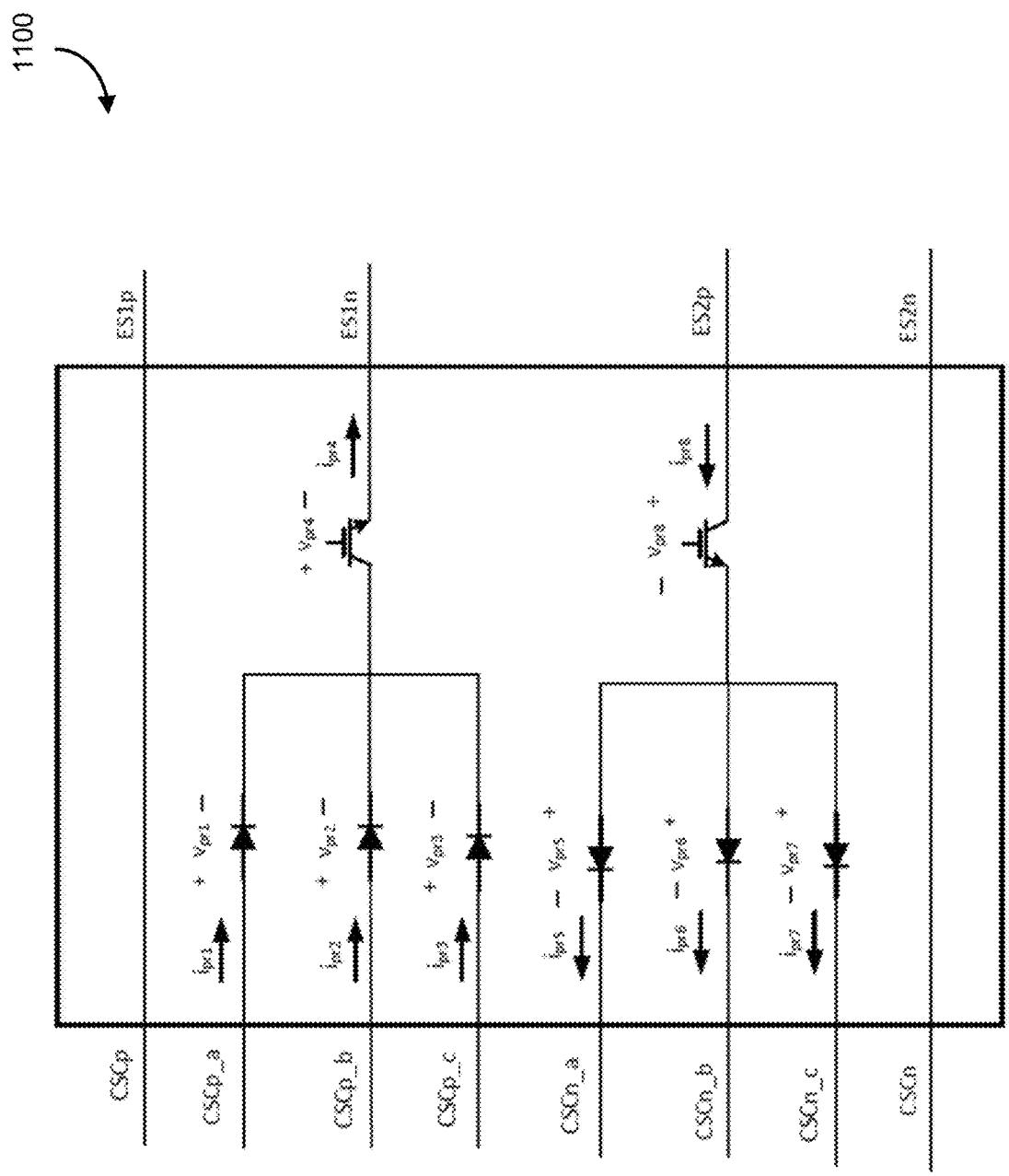
FIG. 11 is an example embodiment of the polarity inversion module, FIG. 9, according to some embodiments.

In V2G mode, in an example embodiment of the polarity inversion module 1100 of FIG. 11, when the upper switch of the upper charging stage for phase "w" is on (or equivalently conducting or active), the ES1 is inserted in that branch. And when lower switch of the upper charging stage for phase "w" is, the ES1 is by-passed in that branch. The principle applies to the other phases "v" and "u". Conversely, in V2G mode, in an example embodiment of the polarity inversion module of FIG. 11, when the upper switch of the lower charging stage for phase "w" is on (or equivalently conducting or active), the ES2 is by-passed in that branch. And\ when lower switch of the lower charging stage for phase "w" is on, the ES2 is inserted in that branch. The principle applies to the other phases "v" and "u"

By decreasing the duration or duty cycle in a given switching period that ES1 or ES2 are inserted into a branch the average back emf of that branch will decrease. This ability to reduce the back emf voltage enables the dual inverter drive to perform a boosting function such that power can be exchanged when the sum of the ES1 and ES2 voltages is greater than the maximum average rectified voltage across the CSC DC terminals.

When the energy storage element is inserted into the branch in some embodiments, that energy storage element will be charged during charging mode and discharged during discharge mode by that branch current. That branch current is the current of the motor winding for that branch.

Conversely, when the energy storage element is by-passed for a particular branch, in some embodiments, that energy storage element will not be charged or discharged by that branch current. Therefore, as an example if ES1 was inserted in all three branches it would be charged in charge mode or discharged in discharge mode by all three motor winding currents.

Conversely, if ES1 was bypassed in all three branches it would not be charged or discharged by the branch current. Note, that the power delivered to or delivered by the energy storage element is dictated by the voltage of the energy storage element and the current flowing through that energy storage element.

Therefore, when it is mentioned that the energy storage element would be charged or discharged by a particular current it means that the power delivered to or removed from the energy storage element is equal to the voltage of the energy storage element multiplied by the current flowing through that energy storage element. If losses are not considered, the sum of the power to energy storage element 1 and energy storage element 2 is the power exchanged with the AC grid in some embodiments.

Given the structure of the dual-inverter drive, it is possible to deliver a different power to ES1 and ES2. If in a particular branch, ES1 is inserted for a greater duration in a given switching period then ES2, the motor winding current for that branch will flow into ES1 for more duration than ES2. If ES1 and ES2 have approximately the same voltage value, then the power into ES1 will be greater than the power into ES2. The power into ES1 and into ES2 for a particular phase, can be approximated by the following equation, $$P_{ES1,w} = d_{w1} * E_{s1}$$

$$P_{ES2,w} = d_{w2} * E_{s2}$$

Therefore, by adjusting the duty cycle $d_{w1}$ with respect to dw2 it is possible to deliver differential power to ES1 with respect to ES2. The same principle applies for the other traction inverter phases.

Description of Polarity Inversion Module Elements

The role of the polarity inversion module 306 is to invert the polarity of the back emf provided by the dual-inverter drive. Polarity inversion is required for enabling V2G capability.

Figure 4:
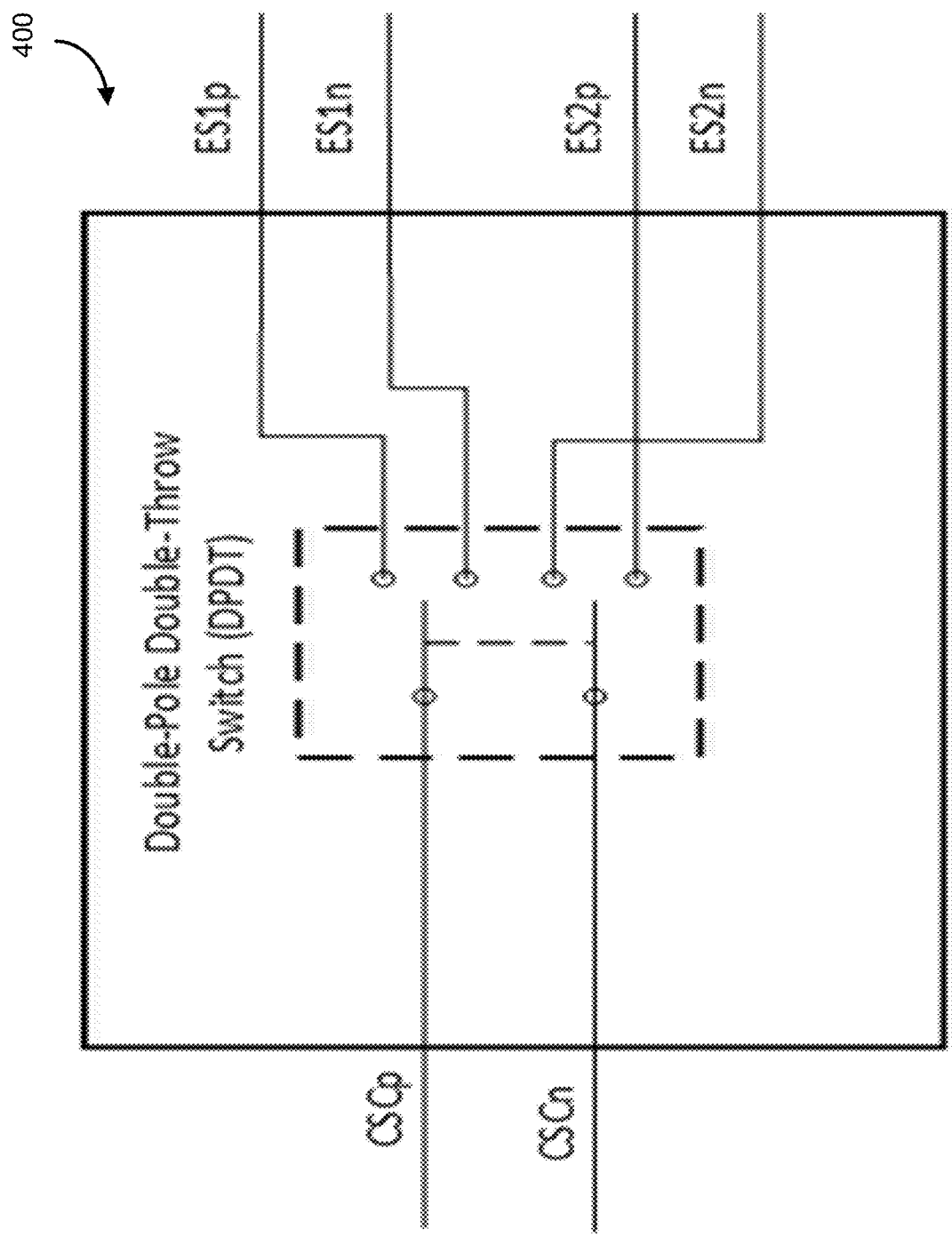
FIG. 4 presents an embodiment of the polarity inversion module.
Figure 8:
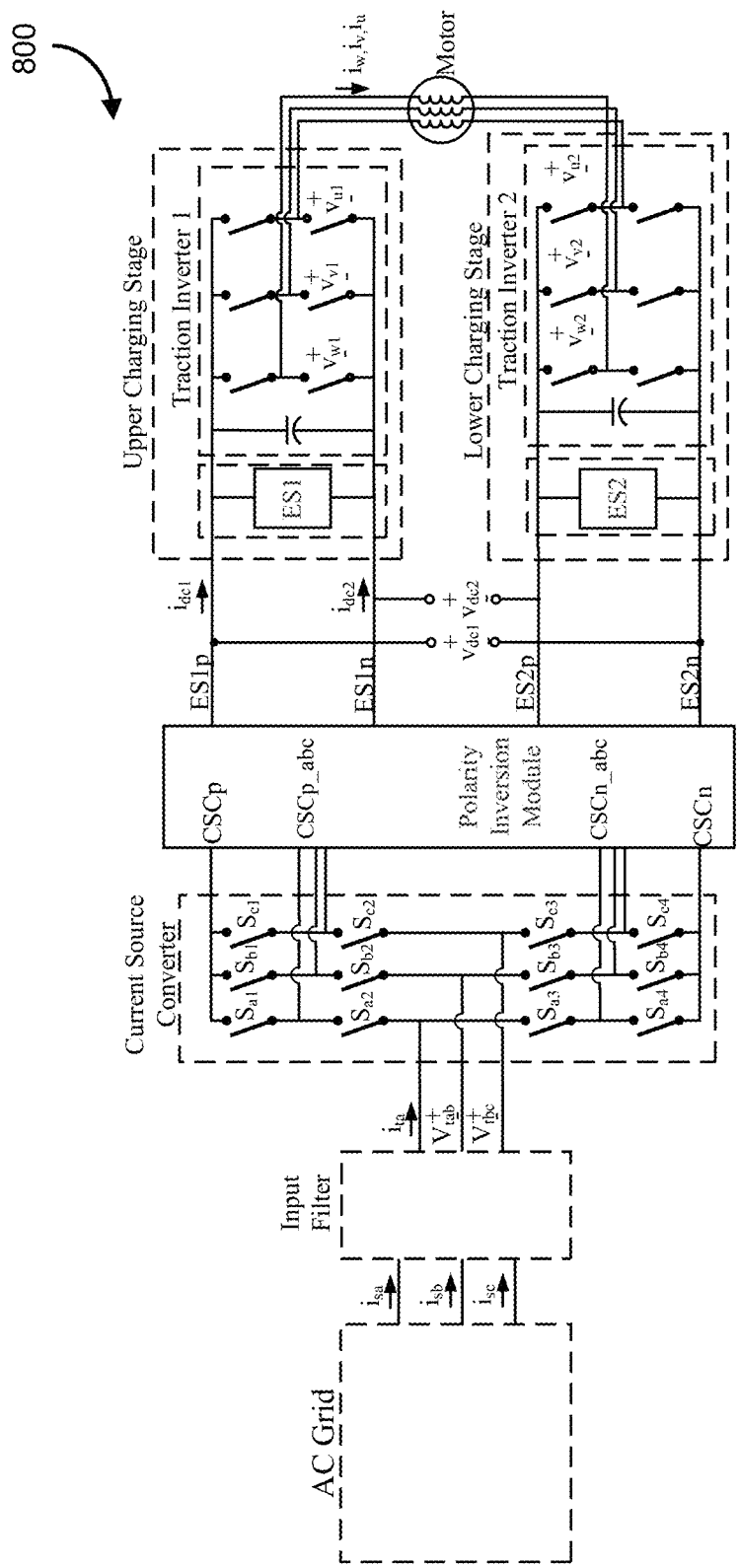
FIG. 8 presents a more specific embodiment of the embodiment presented in FIG. 3.

Three variations of the polarity inversion module 306 are outlined in FIG. 4, FIG. and FIG. 6. These variations are applicable to the CSC front-end topology 304 depicted in FIG. 3. The fourth variation of the polarity inversion module is presented in FIG. 7. This fourth variation is applicable to the subset of CSC topologies which share the structure of that presented in diagram 800 of FIG. 8. In this CSC structure, the mid-point of each switch pair for each arm is accessible to the polarity inversion module 306.

Polarity Inversion Module Variant 1

The first embodiment of the polarity inversion module is outlined in FIG. 4.

In this variant, the polarity inversion circuit is coupled to the upper charging stage at the negative VSC1 DC terminal and to the lower charging stage at a positive VSC2 DC terminal, and includes at least one switch and that interfaces the CSC with the dual inverter drive, with the polarity inversion circuit having a first state and a second state; the first state coupling the positive CSC DC terminal and the positive VSC1 DC terminal, and coupling the negative CSC DC terminal and the negative VSC2 DC terminal; and a second state coupling the positive CSC DC terminal and the negative VSC1 DC terminal, and coupling the negative CSC DC terminal and the positive VSC2 DC terminal; wherein the in the first state, power is directed to the electrical vehicle or the hybrid electric vehicle and the in the second state, power is directed to the AC grid.

An example mechanical switch solution is shown at 400. In this embodiment, there is a double-pole double-throw switch (DPDT) interfacing the CSC with the dual-inverter drive. There are two switch states for the DPDT switch.

The can be adapted to first state and a second state; the first state coupling the positive CSC DC terminal and the positive VSC1 DC terminal, and coupling the negative CSC DC terminal and the negative VSC2 DC terminal; and a second state coupling the positive CSC DC terminal and the negative VSC2 DC terminal, and coupling the negative CSC DC terminal and the positive VSC1 DC terminal; wherein the in the first state, power is directed to the vehicle and the in the second state, power is directed to the grid.

Referring to FIG. 4, in switch state 1, the CSCp and ES1p terminals are connected; and the CSCn and the ES2n terminals are connected. In switch state 2, the CSCp and ES1n terminals are connected; and the CSCn and ES2p terminals are connected. Please note that there are alternate switch state possibilities that will allow for inverting the back emf voltage. The presented case was only one such example.

Note in the first switch position, the positive dc terminal of the CSC is connected to the positive dc terminal of the first VSC and the negative dc terminal of the CSC is connected to the negative terminal of the second VSC; and the second switch position, the positive dc terminal of the CSC is connected to the negative dc terminal of the first VSC and the negative dc terminal of the CSC is connected to the positive terminal of the second VSC.

Not it is also possible for the second position to be such that the positive dc terminal of the CSC is connected to the negative terminal of the second VSC and the negative dc terminal of the CSC is connected to the positive dc terminal of the first VSC.

Additionally, while the mechanical switch solution shown at 400 is of a DPDT switch it would also be possible to implement this with a DPST switch.

As described in an earlier section, depending on the states of the upper traction inverter switches either ES1 will be inserted or by-passed in the traction inverter phase and depending on the states of the lower traction inverter switches either ES2 will be inserted or by-passed in the traction inverter phase (or equivalently termed branch).

For each of the polarity inversion module variants, the polarity inversion module has a first state and a second state. The current flowing into ES1 and ES2 will be positive in the first state and in a second state, the current flowing into ES1 and ES2 will be negative.

This ability to reverse the direction of the current flowing into ES1 and ES2 gives the polarity inversion module the ability to in effect reverse the polarity of ES1 and ES2.

Therefore, in the first state the back emf of the dual-inverter can be modelled as a positive voltage value and in the second state the back emf of the dual-inverter can be modelled as a negative voltage value. In some embodiments of the polarity inversion module variant 1, when ES1p is coupled to CSCp and ES2n is coupled to CSCn, the currents into ES1 and ES2 are positive and conversely when CSCp is coupled to ES1n and CSCN is coupled to ES2p the currents into ES1 and ES2 are negative.

Note, there may be other ways to connect this polarity inversion module variant to the VSC DC terminals.

An advantage of this variant of the polarity inversion module is that it is a mechanical solution that may be easier than a semiconductor switch based solution and cost effective to implement.

A limitation of this variant is that due to being a mechanical solution, the speed of switching between charge and discharge module is slower in some embodiments to a polarity inversion module in which semiconductor switches are employed.

Polarity Inversion Module Variant 2

Figure 5:
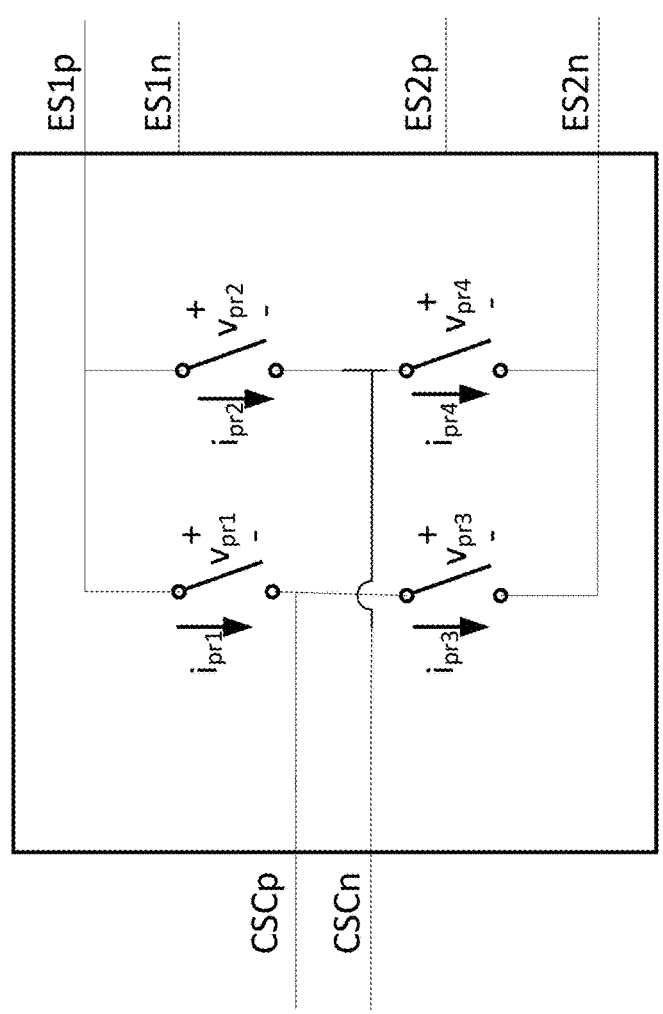
FIG. 5 presents a second embodiment of the polarity inversion module.

FIG. 5 presents an alternate embodiment of the polarity inversion module. The polarity inversion circuit could alternatively consist of at least four semiconductor switches with each switch of the at least four semiconductor switches coupling one CSC DC terminal to one VSC DC terminal.

The switches can each be realized either via mechanical switches and/or electronic switches. A summary of the blocking voltage and current conduction constraints are as follows:

$V_{pr1} > 0\ V, I_{pr1} < 0\ A$    Switch $S_{pr1}$:

$V_{pr2} > 0\ V, I_{pr2} > 0\ A$    Switch $S_{pr2}$:

$V_{pr3} > 0\ V, I_{pr3} > 0\ A$    Switch $S_{pr3}$:

$V_{pr4} > 0\ V, I_{pr4} < 0\ A$    Switch $S_{pr4}$:

One switch couples the positive dc terminal of the CSC to the positive terminal of the first VSC; one switch couples the positive dc terminal of the CSC to the negative terminal of the second VSC; one switch couples the negative dc terminal of the CSC to the positive terminal of the first VSC; one switch couples the negative dc terminal of the CSC to the negative terminal of the second VSC.

Figure 9:
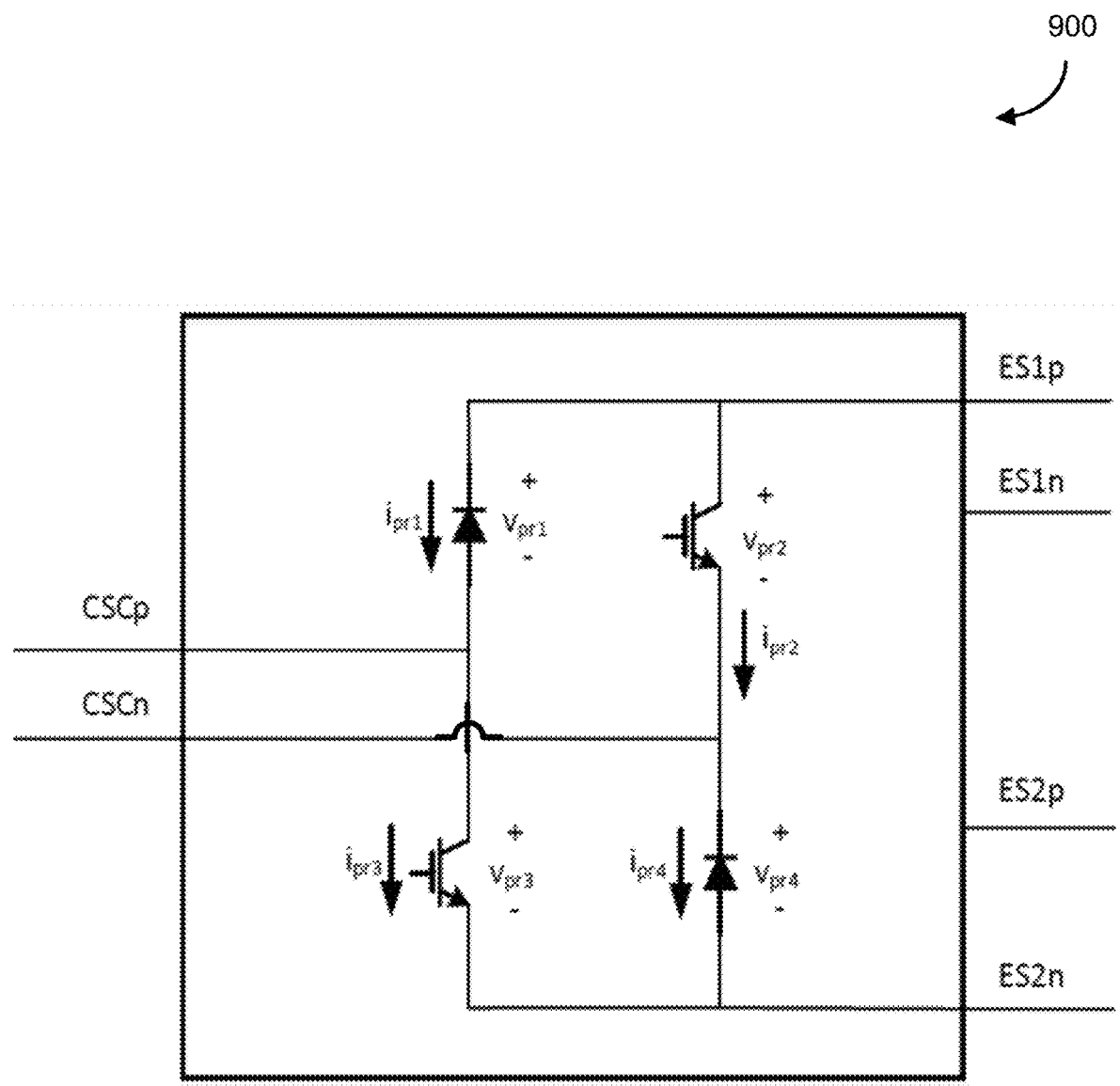
FIG. 9 is an example polarity inversion module, according to some embodiments.

Each switch must block a uni-polar voltage of positive polarity and conduct uni-directional current. The direction of current is opposite for the upper and lower switch of a phase. An example implementation of this embodiment of the polarity inversion module is presented in the partial circuit diagram 900 of FIG. 9.

As described in an earlier section, depending on the states of the upper traction inverter switches either ES1 will be inserted or by-passed in the traction inverter phase and depending on the states of the lower traction inverter switches either ES2 will be inserted or by-passed in the traction inverter phase (or equivalently termed branch). For each of the polarity inversion module variants, the polarity inversion module has a first state and a second state.

The current flowing into ES1 and ES2 will be positive in the first state and in a second state, the current flowing into ES1 and ES2 will be negative. This ability to reverse the direction of the current flowing into ES1 and ES2 gives the polarity inversion module the ability to in effect reverse the polarity of ES1 and ES2.

Therefore, in the first state the back emf of the dual-inverter can be modelled as a positive voltage value and in the second state the back emf of the dual-inverter can be modelled as a negative voltage value. In some embodiments of the polarity inversion module variant 2, when ES1p is coupled to CSCp and ES2n is coupled to CSCn, the currents into ES1 and ES2 are positive and conversely when CSCp is coupled to ES2n and CSCn is coupled to ES1p the currents into ES1 and ES2 are negative.

Note, there may be other ways to connect this polarity inversion module variant to the VSC DC terminals.

An advantage of this variant of the polarity inversion module is that it is a power electronic solution and therefore switching between charge and discharge mode could be made quickly. Additionally, electrical connections between the polarity inversion module and the upper and lower charge stage are only required in some embodiments on the ES1p and ES2n terminals. A limitation of this variant is that the blocking voltage for the polarity inversion module switches is the sum of the ES1 and ES2 voltages.

Polarity Inversion Module Variant 3

FIG. 6 presents an alternate embodiment of the polarity inversion module. The switches can each be realized either by mechanical switches and/or electronic switches. A summary of the blocking voltage and current conduction constraints are as follows:

$V_{pr1} > 0\ V, I_{pr1} < 0\ A$    Switch $S_{pr1}$:

$V_{pr2} > 0\ V, I_{pr2} > 0\ A$    Switch $S_{pr2}$:

$V_{pr3} > 0\ V, I_{pr3} > 0\ A$    Switch $S_{pr3}$:

$V_{pr4} > 0\ V, I_{pr4} < 0\ A$    Switch $S_{pr4}$:

One switch couples the positive dc terminal of the CSC to the positive terminal of the first VSC; one switch couples the positive dc terminal of the CSC to the negative terminal of the first VSC; one switch couples the negative dc terminal of the CSC to the positive terminal of the second VSC; one switch couples the negative dc terminal of the CSC to the negative terminal of the second VSC.

Figure 10:
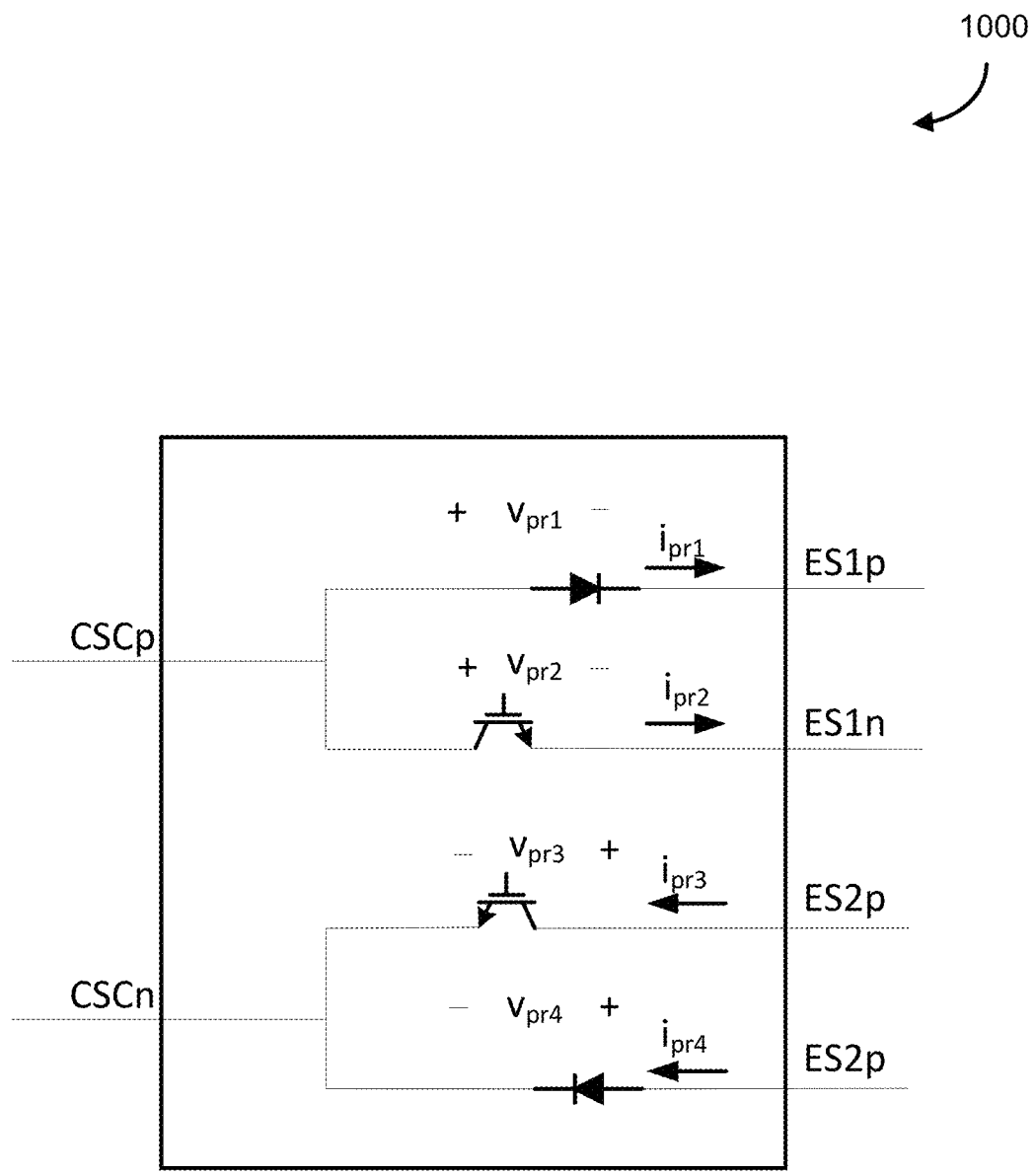
FIG. 10 is another example polarity inversion module, according to some embodiments.

Each switch must block uni-polar voltages and conduct current of positive direction. An example implementation of this embodiment of the polarity inversion module is presented in diagram 1000 of FIG. 10.

As described in an earlier section, depending on the states of the upper traction inverter switches either ES1 will be inserted or by-passed in the traction inverter phase and depending on the states of the lower traction inverter switches either ES2 will be inserted or by-passed in the traction inverter phase (or equivalently termed branch). For each of the polarity inversion module variants, the polarity inversion module has a first state and a second state.

The current flowing into ES1 and ES2 will be positive in the first state and in a second state, the current flowing into ES1 and ES2 will be negative. This ability to reverse the direction of the current flowing into ES1 and ES2 gives the polarity inversion module the ability to in effect reverse the polarity of ES1 and ES2.

Therefore, in the first state the back emf of the dual-inverter can be modelled as a positive voltage value and in the second state the back emf of the dual-inverter can be modelled as a negative voltage value. In some embodiments of the polarity inversion module variant 3, when ES1p is coupled to CSCp and ES2n is coupled to CSCn, the currents into ES1 and ES2 are positive and conversely when CSCp is coupled to ES1n and CSCn is coupled to ES2p the currents into ES1 and ES2 are negative.

An advantage of this variant of the polarity inversion module is that it is a power electronic solution and therefore switching between charge and discharge mode could be made quickly. Additionally, the blocking voltage for the polarity inversion module switches is equal to either ES1 or ES2 voltages, respectively. A disadvantage of this variant is that the polarity inversion module connects to ES1p, ES1n, ES2p and ES2n.

Note, there may be other ways to connect this polarity inversion module variant to the VSC DC terminals.

Polarity Inversion Module Variant 4

FIG. 7 presents an alternate embodiment of the polarity inversion module.

Each phase of the CSC is associated with two switches, an upper switch corresponding to the phase and a lower switch corresponding to the phase, each of the upper switch and the lower switch corresponding to the phase comprising a first and a second series connected sub-switches with an accessible mid-point.

The first sub-switch provides positive voltage blocking capability and the second sub-switch provides negative voltage blocking capability.

The polarity inversion module includes a first three phase switch network and a second three phase switch network, with each three phase switch network including at least four switches, three switches for each phase and one master switch that is to controllable.

The positive CSC DC terminal and the positive VSC1 DC terminal are electrically bonded, and the negative CSC DC terminal and the negative VSC2 DC terminal are electrically bonded in this example.

The first three phase switch network couples the mid-point of the three upper sub-switches to the dual inverter drive.

The second three phase switch network couples the mid-point of the three lower sub-switches to the dual inverter drive; the polarity inversion circuit has a first state and a second state: in the first state, the first and second master control switches are controlled to be off and the first and second phase switch network are not active; in the second state, the first and second master control switches are controlled to be on and the first and second phase switch network are active.

In the first state, power is directed to the vehicle; and in the second state, power is directed to the AC grid. The first three phase switch network can be coupled to the negative VSC1 DC terminal, and the second three phase switch network can be coupled to the positive VSC2 DC terminal.

In a further variation, the first three phase switch network is coupled to the negative VSC2 DC terminal, and the second three phase switch network is coupled to the positive VSC1 DC terminal.

As an example implementation using a number of switches, the polarity inversion module can include 8 switches, denoted as $S_{pr1}, S_{pr2}, \ldots, S_{pr8}$. Switch $S_{pr1}$ must have the capability of blocking voltages and conducting currents of the same polarity and direction, respectively, as that required of the corresponding phase switch, $S_{a1}$. Switch $S_{pr5}$ must have the capability of blocking voltages and conducting currents of the same polarity and direction as that required of the corresponding phase switch, $S_{a4}$. Similar requirements apply to the phase b switches ($S_{pr2}$ and $S_{pr6}$) and phase c switches ($S_{pr3}$ and $S_{pr7}$).

If $S_{pr1}$, $S_{pr2}$ and $S_{pr3}$ are implemented with switches with reverse voltage blocking capability (such as IGBTs), $S_{pr4}$ is not required and can instead be replaced by a conductive element. Similarly, if $S_{pr5}$, $S_{pr6}$ and $S_{pr7}$ are implemented with switches with reverse voltage blocking capability, $S_{pr8}$ is not required and can instead be replaced by a conductive element. This polarity inversion module variant is configured such that either $S_{a1}$, $S_{b1}$ and $S_{c1}$ are conducting or $S_{pr1}$, $S_{pr2}, \ldots, S_{pr4}$ are conducting.

The same principle applies to the lower arm switches. In an embodiment, in charging mode, the polarity inversion elements $S_{pr1}, S_{pr2}, \ldots S_{pr8}$ are non-conducting. In this mode, the positive terminal of the CSC is connected to the positive terminal of energy storage element 1; and the negative terminal of the CSC is connected to the negative terminal of energy storage element 2.

In an example embodiment, in V2G mode, the polarity inversion elements $S_{pr1}, S_{pr2}, \ldots, S_{pr8}$ are conducting. In this mode, the CSC mid-points, CSCp_a, CSCp_b and CSCp_c, are connected to the negative terminal of energy storage element 1; and the CSC mid-points, CSCn_a, CSCn_b and CSCn_c, are connected to the positive terminal of energy storage element 2.

Note, the switches $S_{pr4}$ and $S_{pr8}$ can be implemented with either a mechanical type-switch or semi-conductor type-switch.

An example implementation of this embodiment of the polarity inversion module is presented in diagram 1100 of FIG. 11.

Note, in this mode, each phase of the CSC features two switches, a first switch termed the upper switch and a second switch termed the lower switch. Each of the CSC switches is composed of two sub-switches, a first sub-switch provides positive voltage blocking capability and a second sub-switch provides negative voltage blocking capability.

A first, second and third switch interface the mid-point of the three upper sub-switches of the CSC to a fourth switch. The fourth switch is interfaced to the negative DC terminal of the first VSC.

A fifth, sixth and seventh switch interface the mid-point of the three upper sub-switches of the CSC to an eighth switch. The eighth switch is interfaced to the positive DC terminal of the second VSC.

As described in an earlier section, depending on the states of the upper traction inverter switches either ES1 will be inserted or by-passed in the traction inverter phase and depending on the states of the lower traction inverter switches either ES2 will be inserted or by-passed in the traction inverter phase (or equivalently termed branch).

For each of the polarity inversion module variants, the polarity inversion module has a first state and a second state. The current flowing into ES1 and ES2 will be positive in the first state and in a second state, the current flowing into ES1 and ES2 will be negative. This ability to reverse the direction of the current flowing into ES1 and ES2 gives the polarity inversion module the ability to in effect reverse the polarity of ES1 and ES2.

Therefore, in the first state the back emf of the dual-inverter can be modelled as a positive voltage value and in the second state the back emf of the dual-inverter can be modelled as a negative voltage value. In some embodiments of the polarity inversion module variant 4, when Spr4 and Sp8 are off (i.e. phase switch networks are not conducting current), the currents into ES1 and ES2 are positive and conversely when Spr4 and Sp8 are on (i.e. the phase switch networks are conducting current), the currents into ES1 and ES2 are negative.

Note, there may be other ways to connect this polarity inversion module variant to the VSC DC terminals.

An advantage of this variant over the other polarity inversion module variants is that the losses in charging mode should be comparable to the losses in charging mode in electric power trains that do not feature any polarity inversion module. This is because there are no additional switches inserted in the circuit during charge mode. Note, CSCp is electrically bonded to ES1p and CSCn is electrically bonded to ES2n in this variant. A limitation of this variant is that more switches are required.

Note, there may be other ways to connect this polarity inversion module variant to the VSC DC terminals.

Operating Mechanism
Overview of Operating Mechanism

Figure 12:
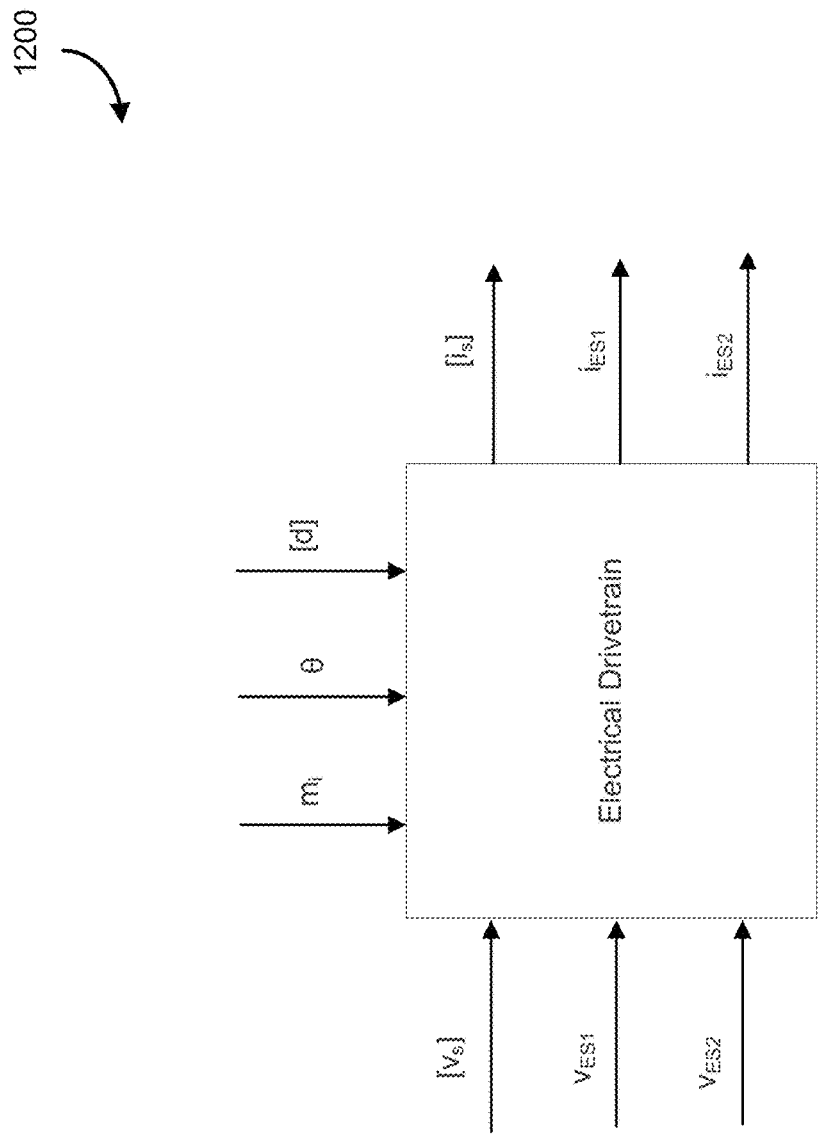
FIG. 12 presents a high-level diagram of the electrical inputs, control inputs and outputs of the three-port electric powertrain for charging and vehicle-to-grid mode. Describes at a high level, here are the control inputs, here are the outputs.

An overview of the operating mechanism during charging and V2G modes of operation is presented in FIG. 12 as shown in diagram 1200. As can be seen the inputs to the converter are: 1) three-phase AC grid voltage; 2) energy storage element 1 emf; and 3) energy storage element 2 emf. The controlled quantities are the three-phase AC input current and the charging currents to energy storage element 1 and 2. Therefore, this converter operates as a three-port converter unlike a conventional current source converter which operates as a two-port converter. A converter is a machine that can be used to implement the operating mechanism and variants thereof.

Control of Integrated Powertrain for Charging

Figure 13:
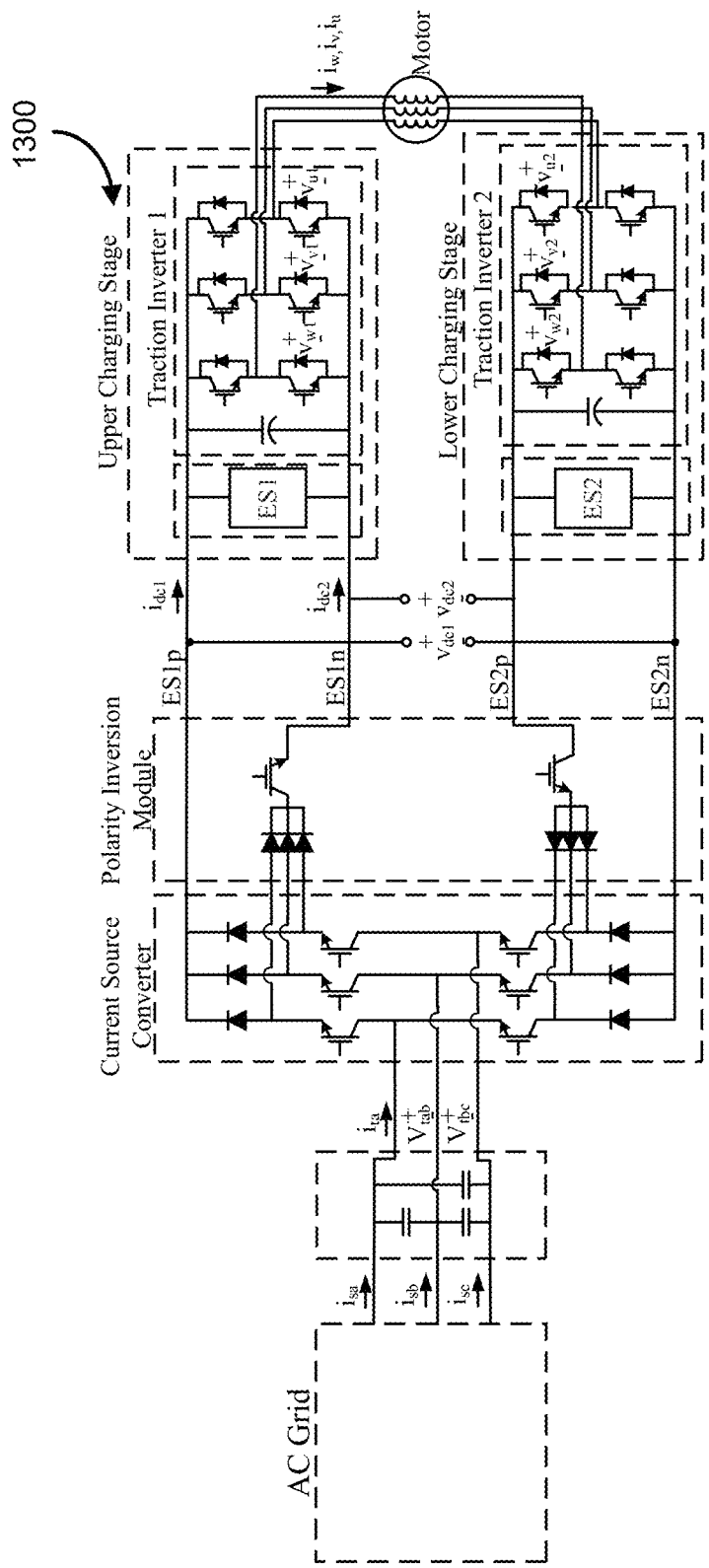
FIG. 13 presents an embodiment which details one possible implementation of the preferred embodiment.

To illustrate the operation of the converter in charging mode it is best to refer to an example implementation such as that presented in FIG. 13 at circuit diagram 1300.

With the control one or more states of the one or more switches within the VSCs and the CSC are controlled to regulate the active power being exchanged between the energy storage elements and the AC network.

In charging mode, the two active switches of the polarity inversion module 306 will not be conducting. In this configuration, the positive terminal of energy storage element 1, ES1p, will be connected to the positive rail of the current source converter, CSCp; and the negative terminal of the energy storage element 2, ES2n, will be connected to the negative rail of the current source converter, CSCn. Therefore, in this mode a back emf of positive polarity is applied to the current source converter. If V2G operation is not required then the polarity inversion module may be entirely omitted.

During charging (and V2G) mode, the dual-inverter drive effectively consists of three parallel branches; where, each branch consists of two emf sources and a series inductance. The series inductance is the leakage inductance of the motor winding.

By alternatively gating the upper and lower switches of the upper charging stage of a branch, energy storage element 1 is alternatively by-passed and inserted into the branch, respectively in charging mode; and by gating the upper and lower switch of the lower charging stage, energy storage element 2 is alternatively inserted and by-passed in the branch, respectively, in charging mode. Conversely in V2G mode, by alternatively gating the upper and lower switches of the upper charging stage, energy storage element 1 is alternatively inserted and by-passed in the branch, respectively; and by gating the upper and lower switch of the lower charging stage, energy storage element 2 is alternatively by-passed and inserted into the branch, respectively.

Therefore, by modulating the gating signals, each branch has two variable emf sources—ranging from the full emf of the energy storage element to 0 volts in the ideal case.

The above is illustrated in the circuit diagram 1400 of FIG. 14. Please note, that the voltage sources of the circuit diagram in FIG. 14 are drawn such that the polarity corresponds to charging mode.

For V2G mode, each voltage source in the circuit diagram of FIG. 14 will have the opposite polarity. The variable emfs shown in FIG. 14 can be mathematically expressed as follows, $$v_{u1} = V_{ES1} \cdot d_{u1} \tag{1}$$

$$v_{v1} = V_{ES1} \cdot d_{v1} \tag{2}$$

$$v_{w1} = V_{ES1} \cdot d_{w1} \tag{3}$$

$$V_{u2} = V_{ES2} \cdot d_{u2} \tag{4}$$

$$v_{v2} = V_{ES2} \cdot d_{v2} \tag{5}$$

$$v_{w2} = V_{ES2} \cdot d_{w2} \tag{6}$$

where, $d_{u1}, \ldots d_{w2}$ denote duty ratios ranging from 0 to a maximum value of 1; $v_{ES1}$ is the emf of energy storage element 1; and $V_{ES2}$ is the emf of energy storage element 2. To avoid torque generation during charging, the DC currents for the three-phase windings are controlled to be equal. Correspondingly, the DC current component of the three-winding currents is expressed as follows, $$I_{v,dc} = I_{w,dc} = I_{u,dc} = \frac{I_{dc}}{3} \tag{7}$$

Therefore, the average power to the two energy storage elements can be calculated as follows, $$P_{ES1} = \frac{I_{dc}}{3} \cdot (V_{ES1} \cdot d_{u1} + V_{ES1} \cdot d_{v1} + V_{ES1} \cdot d_{w1}) \quad (8)$$

$$P_{ES2} = \frac{I_{dc}}{3} \cdot (V_{ES2} \cdot d_{u2} + V_{ES2} \cdot d_{v2} + V_{ES2} \cdot d_{w2}) \quad (9)$$

If $d_{u1} = d_{v1} = d_{w1} = d_1$, and $d_{u2} = d_{v2} = d_{w2} = d_2$, then $$P_{ES1} = I_{dc} \cdot V_{ES1} \cdot d_1 \quad (10)$$

$$P_{ES2} = I_{dc} \cdot V_{ES2} \cdot d_2 \quad (11)$$

Therefore, the charging currents for the two energy sources can be expressed as, $$I_{ES1} = I_{dc} \cdot d_1 \quad (12)$$

$$I_{ES2} = I_{dc} \cdot d_2 \quad (13)$$

The three-phase AC power from the grid can be expressed as follows, $$P_{ac} = \sqrt{3} \, V_{s,rms} \cdot I_{s,rms} \cdot \cos(\theta) \quad (14)$$

Where, $V_{s,rms}$ is the line-to-line grid voltage; $I_{s,rms}$ is the grid line current; and $\theta$ is the angle between the positive-sequence component of the grid voltage and line current.

The power factor of the converter is controlled by adjusting $\theta$. There are multiple modulation schemes that can be used for controlling the CSC 306—one approach being to use a space-vector PWM (SVPWM) technique. For SVPWM control, the magnitude of the ac-side line current can be expressed as follows, $$I_{s,rms} = \frac{1}{\sqrt{2}} I_{dc} \cdot m_i \quad (15)$$

where, $m_i$ is the modulation index for the CSC which can range from a minimum of 0 to a maximum of 1.

Substituting eq. 15 into eq. 14, yields, $$P_{ac} = \sqrt{\frac{3}{2}} V_{s,rms} I_{dc} \cdot m_i \cdot \cos(\theta) \quad (16)$$

If losses are neglected, the expression $P_{ac} = V_d \cdot I_{dc}$ can be substituted into eq. 16 yielding the following expression for the dc component of the dc-link voltage, $$V_d = \sqrt{\frac{3}{2}} V_{s,rms} \cdot m_i \cdot \cos(\theta) \quad (17)$$

where, $V_d$ is the DC voltage component of the dc-link voltage.

Assuming negligible resistance on the DC-side of the converter, as well as negligible losses, the AC and DC powers can be related by the following expression, $$P_{ac} = P_{ES1} + P_{ES2} \quad (18)$$

Eq. 10 and 11 can be substituted into eq. 18. The result is equated with the expression, $P_{ac} = V_d \cdot I_{dc}$. This expression is then re-arranged yielding an alternate expression for $V_d$, $$V_d = d_1 \cdot V_{ES1} + d_2 \cdot V_{ES2} \quad (19)$$

The above equations provide an overview of the basic relations governing the operation of the electric powertrain during charging and V2G operation. The developed equations are referred to in the following sections.

Boost-Mode Charging

In boost-mode charging, the sum of the emfs of energy storage elements 1 and 2 is greater than the DC-component of the emf generated by the CSC at the maximum modulation index for the design, $$V_{ES1} + V_{ES2} > V_d(m_i = m_{i,max}) \quad (21)$$

where, $V_d$ is defined in eq. 17 and $m_{i,max}$ is typically near 1.

In this operating case, the modulation index can be held constant at the maximum value. The charging currents for energy storage element 1 and element 2 are controlled by adjusting duty ratio $d_1$ and $d_2$.

Simulation cases 3, 4, 5 and 6 correspond to this operating case. For simulation results, please refer to diagrams 1700, 1800, 1900, and 2000 of FIG. 17, FIG. 18, FIG. 19, FIG. 20. For a high-level description of the simulation cases refer to Table 1.

In Cases 3, 4 and 5 the vehicle is charged at 70 kW with power factors of 0.95 lagging, 0.95 leading and unity power factor, respectively. The energy storage elements are each at 450 V. These cases exhibit similar behaviour on the dc-side of the converter which can be observed when comparing plots c) to g) between FIG. 17, FIG. 18 and FIG. 19. These cases differ with respect to the ac-side of the CSC, however. As can be observed in plots a) and b) of FIG. 17 and FIG. 18, the phase currents are displaced with respect to the phase voltages. The phase displacement between voltage and current corresponds to a lagging and leading power factor, respectively.

Figure 18:
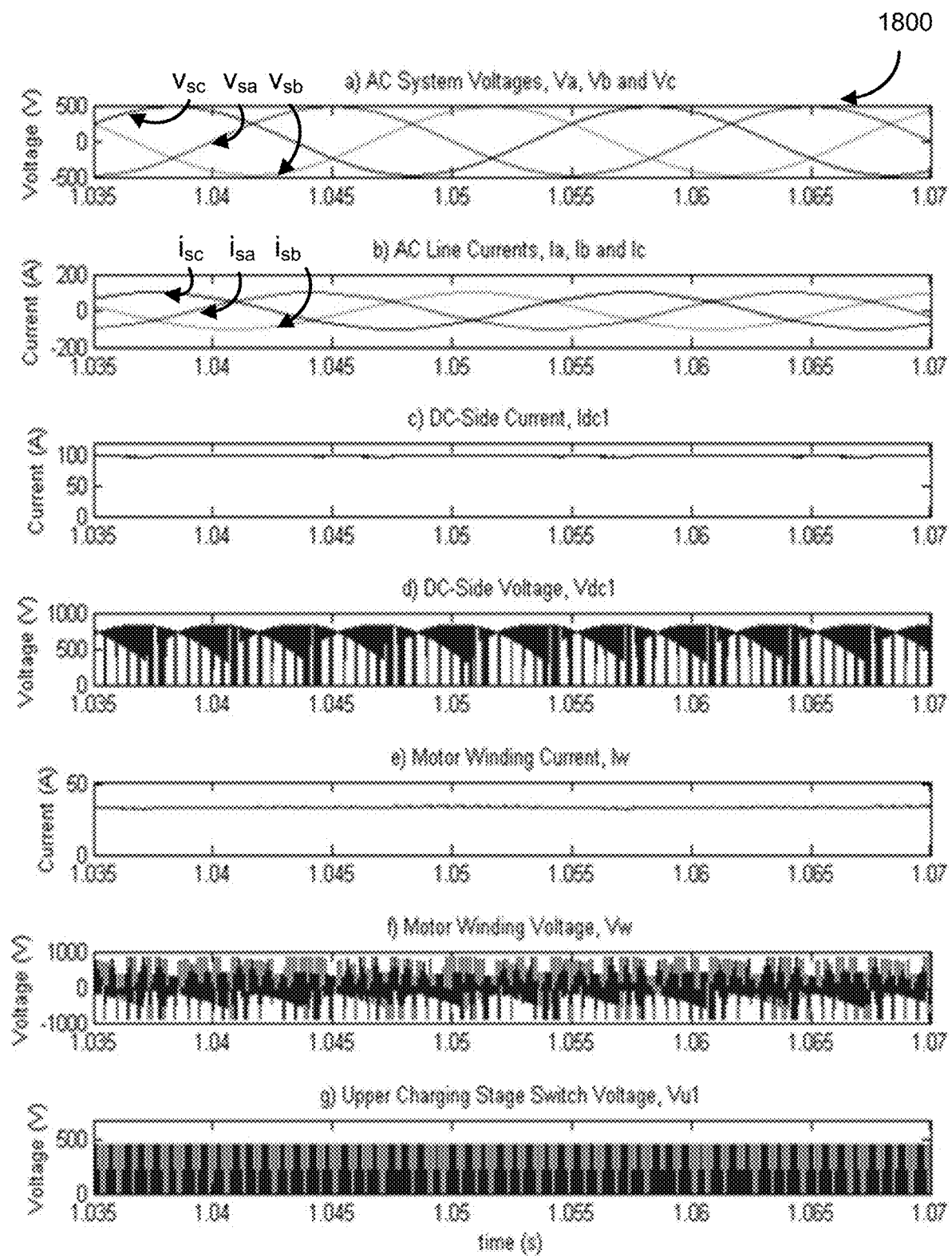
FIG. 18 presents simulation results for Case 4, according to some embodiments. In Case 4, the vehicle is charged at 70 kW at a power factor of 0.95 leading from a 600 V three-phase AC grid. The energy storage elements are each at 450 V.
Figure 19:
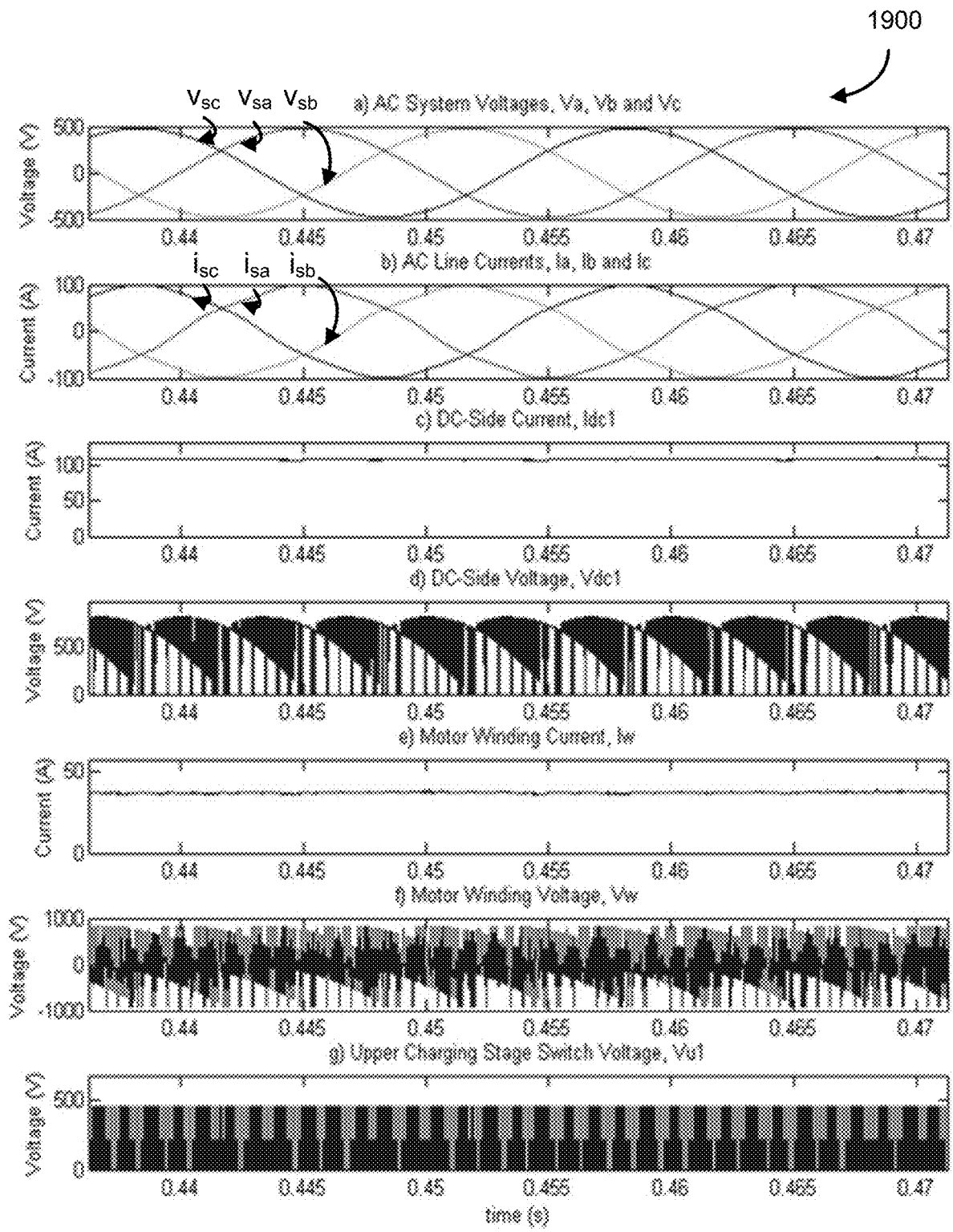
FIG. 19 presents simulation results for Case 5, according to some embodiments. In Case 5, the vehicle is charged at 70 kW at unity power factor from a 600 V three-phase grid. The energy storage elements are each at 450 V.

For Case 5, the phase currents and phase voltages are in-phase (FIG. 19). In addition, the phase currents are of greater magnitude for the 0.95 power factor cases (FIG. 17 and FIG. 18) compared with the unity power factor case (FIG. 19) due to the addition of a reactive power ac component. In Case 6, power is delivered from the vehicle to the grid at unity power factor for energy storage elements voltages of 450 V each. Case 5 and Case 6 are different in that Case 6 is a V2G operating mode case whereas Case 5 is a charging operating mode case.

Figure 20:
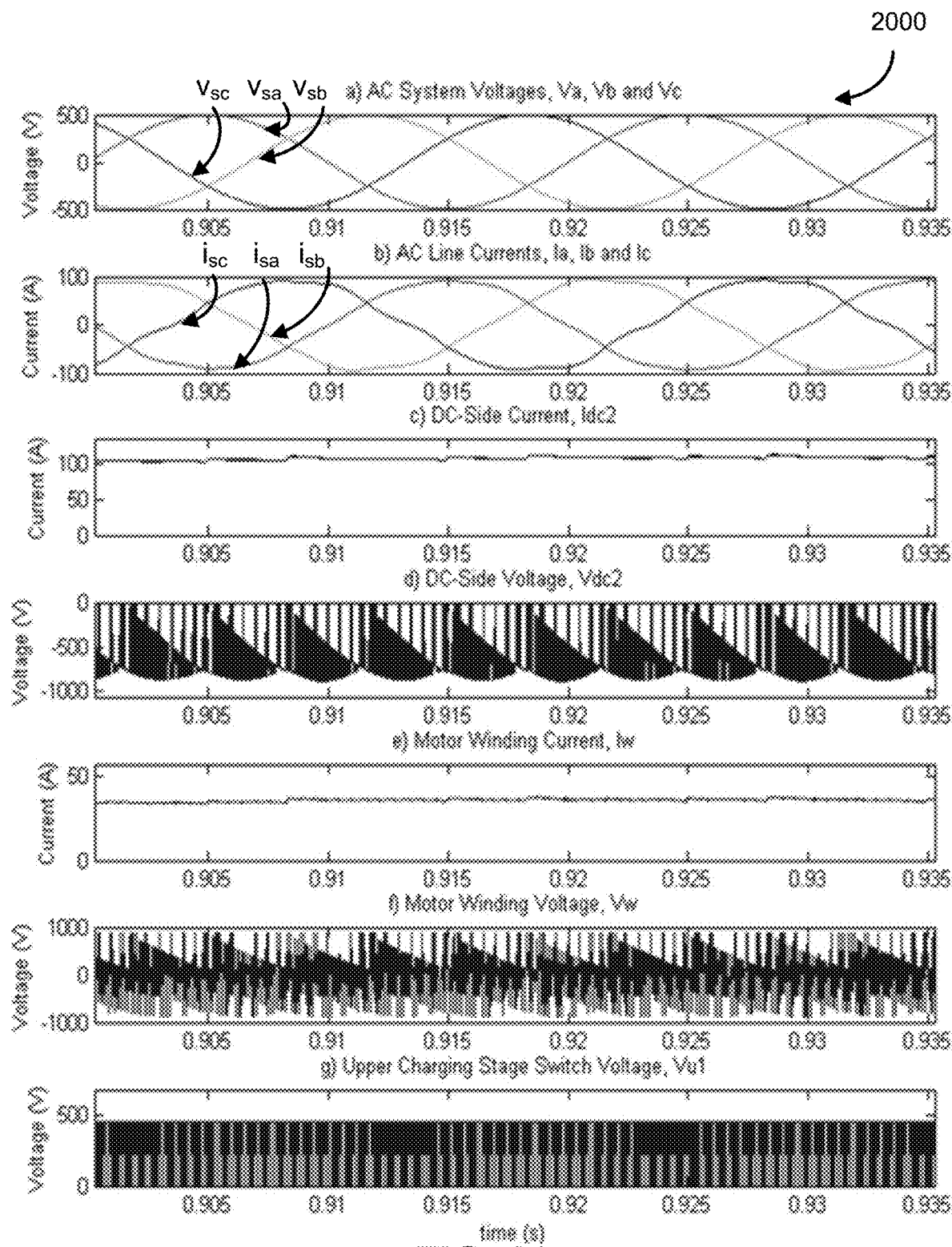
FIG. 20 presents simulation results for Case 6, according to some embodiments. In Case 6, the vehicle is delivering 70 kW of power to the 600 V three-phase grid at unity power factor. The energy storage elements are at 450 V.

Therefore, comparing FIG. 19 and FIG. 20, the phase currents are 180 degrees displaced from the corresponding phase voltages in Case 6 and conversely the phase currents are in-phase with the corresponding phase voltages in Case 5. In addition, the dc-link voltage is of negative polarity in plot d) for the V2G case, Case 6.

Buck-Mode Charging

In buck-mode charging, the sum of the emfs of energy storage elements 1 and 2 is less than the DC-component of the emf generated across the DC-terminals of the CSC at the maximum modulation index of the design, $m_i = m_{i,max}$, $$V_{es1} + V_{es2} < V_d(m_i = m_{i,max}) \quad (20)$$

where, $V_d$ is defined in eq. 19 and $m_{i,max}$ is typically near 1.

In this operating case, the duty ratios ($d_1$ and $d_2$) can be held constant at a maximum value. The power is then controlled by adjusting the modulation index of the CSC. Simulation cases 1, 2 and 7 correspond to this operating case. For simulation results, please refer to diagrams 1500, 1600, and 2100 of FIG. 15, FIG. 16 and FIG. 21. For a description of the simulation cases refer to Table 1.

Figure 16:
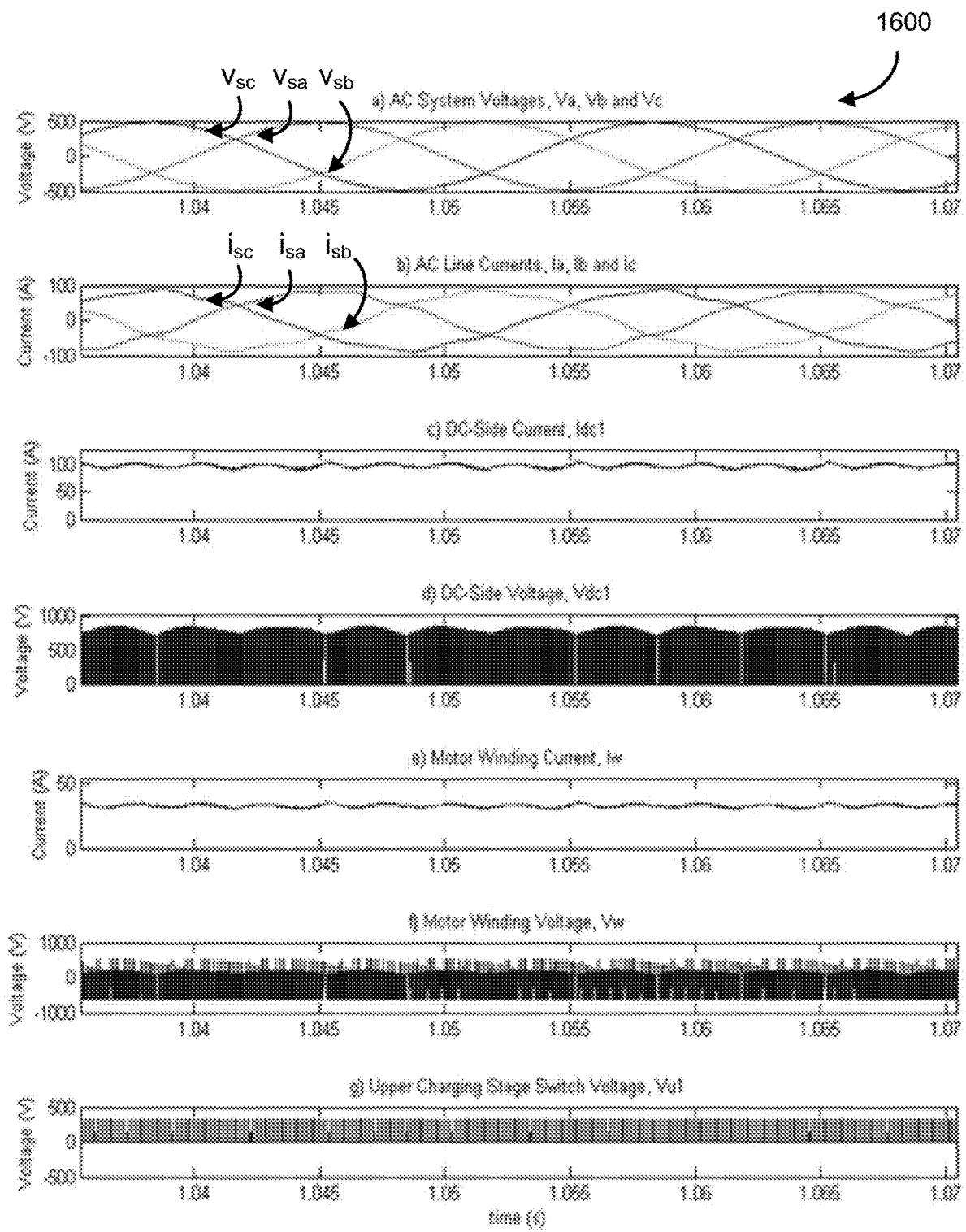
FIG. 16 presents simulation results for Case 2, according to some embodiments. In Case 2, the vehicle is charged at 60 kW at unity power factor from a 600 V three-phase grid. The energy storage elements are at 325 V and 300 V, respectively. During steady-state, energy storage element 2 is at a lower state of charge and is kept in the circuit, by setting the duty ratio at 1. Energy storage element 1 is at the higher state of charge and is modulated such that equal power is delivered to energy storage elements 1 and 2.

In Cases 1 and 2 the vehicle is charged at 60 kW at unity power factor. In both cases, the energy storage element 2 is at a voltage of 300 V. In Case 1, energy storage element 1 is at a voltage of 300 V and in Case 2 energy storage element 1 is at a voltage of 325 V. In Case 1, energy storage element 1 is maintained in the circuit by setting the modulation index to a maximum value of 1 as observed in plot g) of FIG. 17. In Case 2, as shown in FIG. 16, a form of voltage balance control is implemented such that equal power is delivered to energy storage element 1 and element 2.

By way of this voltage balance control, energy storage element 1 is switched in and out of the circuit (i.e. the modulation index is <1) generating an equivalent voltage of 300 V for the upper charging stage. This switching of energy storage element 1 can be observed in plot g) of FIG. 16 and its impact to the motor winding voltage can be observed by comparing plot f) in FIG. 15 and FIG. 16. Case 7 is similar to Case 1 with the exception that Case 7 involves V2G operation and 70 kW of power exchange (compared with the 60 kW of power being exchanged in Case 1).

As can be observed, the magnitude of the ac line side currents (plot b) as well as dc-side currents (plot c and plot e) are greater for Case 7 compared to Case 1. In addition, the ac line currents are 180 degrees out of phase with respect to the corresponding line side voltages for Case 7. Additionally, the dc-side voltages (plot d) is of opposite polarity for Case 7 compared with Case 1.

Energy Balance Control

In order to operate with two independent energy storage elements a form of energy balance control is required.

Some possible implementations include, voltage balance control and circulating current control.

A possible implementation of the voltage balance control is detailed in the following section for illustrative purposes.

Example of a Voltage Balance Control Solution

In a preceding section, eq. 10 and 11 were derived which can be used to calculate the power delivered to energy storage element 1 and 2. The equations are repeated here for readability reasons, $$P_{ES1} = I_{dc} \cdot V_{ES1} \cdot d_1$$

$$P_{ES2} = I_{dc} \cdot V_{ES2} \cdot d_2$$

If $P_{ES1} = P_{ES2}$ are equal then, eq. 10 and 11 can be equated which results in the following, $$V_{ES1} \cdot d_1 = V_{ES2} \cdot d_2 \tag{22}$$

If energy storage element 1 has a greater emf then energy storage element 2, then the duty ratios can be set such that, $$d_1 = \frac{V_{ES2}}{V_{ES1}} \cdot d_2 \tag{23}$$

By reducing $d_1$ by the ratio of the emf voltages equal power is delivered to the two energy storage elements. Note, this is just one possible approach for ensuring equal energy is delivered to the two energy storage elements. It should be noted that another approach would be to deliver unequal power to the two energy storage elements. This could be used to equalize the energy storage element voltages, for instance.

Interleaving

Due to the structure of the dual-inverter drive it is possible to interleave the gating signals of:

The switches of VSC 1 with respect to those of VSC 2 which interface the same motor windings The switches of the phases of the traction inverter 1 (or equivalently VSC 1)

The switches of the phases of the traction inverter 2 (or equivalently VSC2)

Interleaving the gating signals to the switches of VSC 1 with respect to those of VSC 2 which interface the same motor windings is advantageous as it reduces the peak ripple current in the winding currents. Interleaving the gating signals to the switches of the VSC phases with respect to each other is advantageous as it reduces the peak ripple current into the energy storage elements.

Additionally, the result of both types of interleaving is a reduction in the peak ripple dc link current.

This reduction in ripple current has several advantages, including reduced peak currents, reduced high-frequency current into the energy storage elements and reduced harmonic current injected into the ac grid. By reducing the harmonic current injected into the ac grid, it is possible to reduce the size of the ac filter, for instance. Also, since the switching frequency choice is influenced in some embodiments by the peak ripple current it is possible through this interleaving to reduce the switching frequencies, for instance.

One method of generating the gating signals is to compare the duty cycles corresponding to the switches against a carrier such as a sawtooth carrier. The output of this comparison is then delivered to the switches. With a method such as this, the interleaving of the gating signals can be achieved by phase-shifting the sawtooth carriers.

For instance, to interleave the three gating signals of the phases of the traction inverter 1 with respect to each other the carriers can be phase-shifted by 120 degrees each with respect to each other. Similarly, to interleave the three gating signals of the phases of the traction inverter 2 with respect to each other the carriers can be phase-shifted by 120 degrees each with respect to each other To interleave the gating signals of the switches of VSC1 with respect to those of VSC 2 which interface the same motor winding, the carriers can be phase shifted by 180 degrees in some embodiments. Note this is only one such way to perform the interleaving of the gating signals.

In summary, the controller can interleave the switching of the three or more phases of the first VSC and of the second VSC to reduce current harmonics.

The controller can interleave the switching of the first and second VSC (314 and 316) switches to reduce current harmonics.

The controller can also ensure no torque production in the motor drive during charging by ensuring the motor winding currents are dc and equal.

The controller is able to deliver different power to the energy storage element or elements of the first VSC 314 and the energy storage element or energy storage elements of the second VSC 316.

Simulation Results

To demonstrate the operating principles, simulation results are provided. The simulated converter is presented in FIG. 13.

The input filter has been represented as a delta-connected capacitor bank. Each switch of the CSC includes or consists of an insulated-gate bipolar transistor (IGBT) and a series diode which together provides both bi-polar blocking capability and uni-directional current conduction capability. The energy storage elements are considered as batteries with nominal voltages of 500 V.

The motor inverters are represented as three-phase voltage source converters. Each switch of the voltage source converters is an IGBT with an anti-parallel diode providing both bi-directional current conduction capability and uni-polar voltage blocking capability. The motor is represented as a three-phase motor in open-winding configuration. A summary of the main circuit parameters considered for the simulation are as follows:

AC Grid Voltage, $V_{s(line-to-line)}$=600 V
AC Grid Reactance, $L_{ac}$=750 uH
Rated Power of Charger, $P_{conv}$=70 kW
Filter Capacitance, $C_f$=300 uF
Switching frequency of the CSC, $f_{sw}$=25.5 kHz
Switching frequency of the Dual-inverter Drive, $f_{sw}$=9.05 kHz
Nominal Voltage of Battery=500 V A summary of the cases is provided below in Table 1. The results of the simulation cases are presented in FIGS. 15 to 21.

TABLE 1

Description of Simulation Cases

| Case | Mode | Grid Voltage (Vrms) | Battery 1 EMF (V) | Battery 2 EMF (V) | Charging Power (kW) | Power Factor* |
|---|---|---|---|---|---|---|
| 1 | Charging | 600 | 300 | 300 | 60 | 1 |
| 2 | Charging | 600 | 325 | 300 | 60 | 1 |
| 3 | Charging | 600 | 450 | 450 | 70 | 0.95 |
| 4 | Charging | 600 | 450 | 450 | 70 | −0.95 |
| 5 | Charging | 600 | 450 | 450 | 70 | 1 |
| 6 | V2G | 600 | 450 | 450 | 70 | 1 |
| 7 | V2G | 600 | 300 | 300 | 70 | 1 |

*Note
a +ve sign denotes a lagging power factor and a −ve sign denotes a leading power factor.

Figure 15:
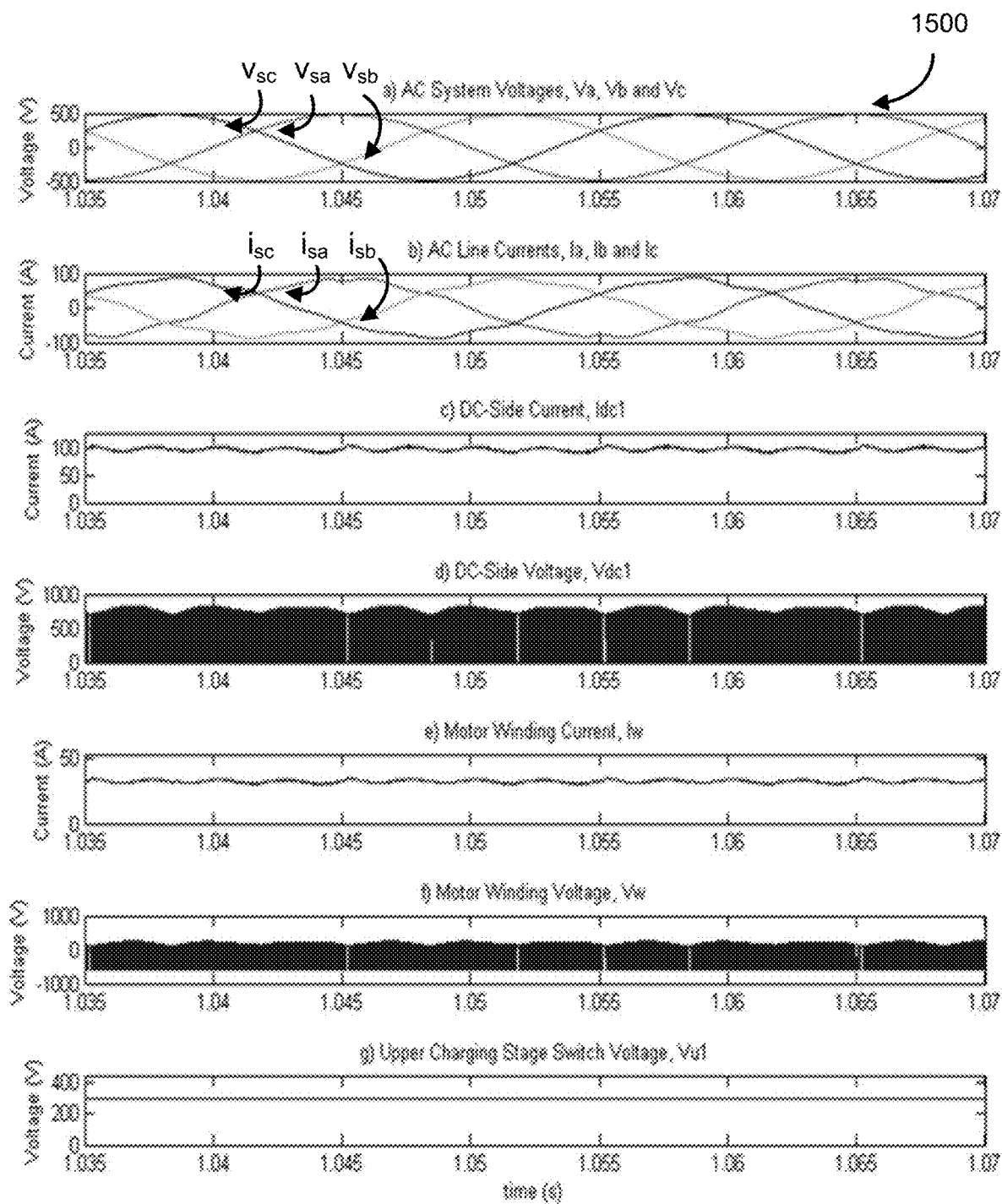
FIG. 15 presents simulation results for Case 1. In Case 1, the vehicle is charged at kW at unity power factor from a 600 V three-phase AC grid, according to some embodiments. The energy storage elements have a terminal voltage of 300 V, respectively.

FIG. 15 or Case 1, illustrates the buck mode operating case, charging mode and equal power being delivered to ES1 and to ES2. The charging power is approximately 60 kW and the power factor is equal to 1. The charging power and power factor can be determined from the plots by comparing the system voltages with the ac line currents.

FIG. 16 or Case 2, illustrates the buck mode operating case, charging mode, and a differential power being delivered to ES1 and to ES2. The charging power is approximately 60 kW and the power factor is equal to 1. The charging power and power factor can be determined by comparing the system voltages with the ac line currents. Comparing FIG. 15 and FIG. 16 it can be observed that the same average power is being delivered to the vehicle, however the distribution of this power to the two energy storages, ES1 and ES2, is different. In FIG. 15 the same power is being delivered to the energy storage elements. In FIG. 16, more power is being delivered to ES2 and less power is delivered to ES1 compared to that in FIG. 15.

Figure 17:
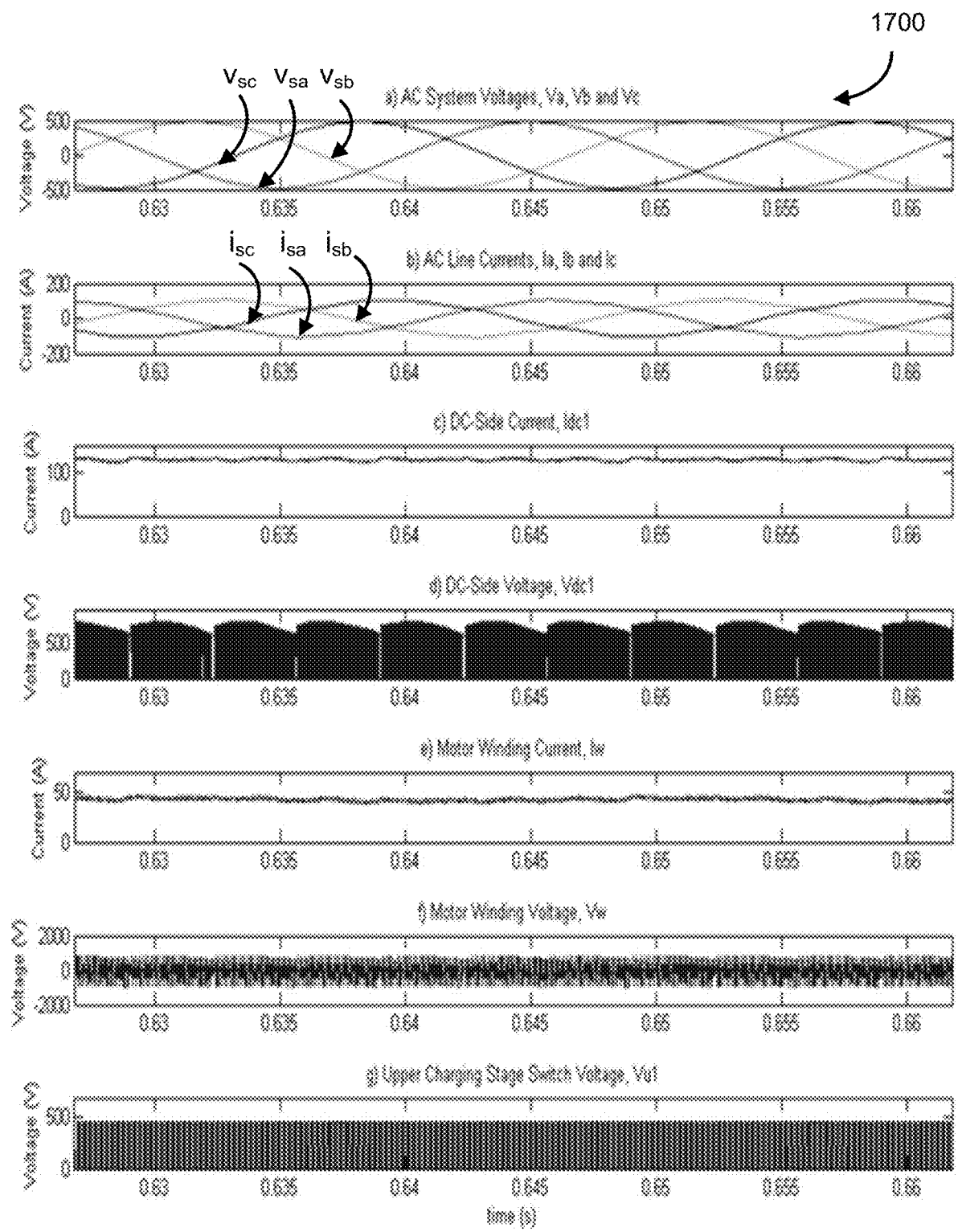
FIG. 17 presents simulation results for Case 3, according to some embodiments. In Case 3, the vehicle is charged at 70 kW at a power factor of 0.95 lagging from a 600 V three-phase AC grid. The energy storage elements are each at 450 V.

FIG. 17 or Case 3, illustrates the boost mode operating case, charging mode, and equal power being delivered to ES1 and to ES2. The charging power is approximately 70 kW and the power factor is equal to 0.95. The charging power and power factor can be determined by comparing the system voltages with the ac line currents.

FIG. 18 or Case 4, illustrates the boost mode operating case, charging mode, and equal power being delivered to ES1 and to ES2. The charging power is approximately 70 kW and the power factor is equal to −0.95. The charging power and power factor can be determined by comparing the system voltages with the ac line currents.

FIG. 19 or Case 5, illustrates the boost mode operating case, charging mode, and equal power being delivered to ES1 and to ES2. The charging power is approximately 70 kW and the power factor is equal to 1. The charging power and power factor can be determined by comparing the system voltages with the ac line currents. The cases of FIG. 17, FIG. 18 and FIG. 19 are similar except that for the change in the power factor. In FIG. 17, reactive power is being absorbed from the grid, in FIG. 18 reactive power being delivered to the grid and in FIG. 19 no reactive power is being exchanged with the grid. This can be observed in comparing the phase angle of the phase currents with respect to the phase voltages. When the phase angle of the phase currents is leading, reactive power is being delivered to the grid. When the phase angle is lagging, reactive power is being absorbed from the grid. When the phase angles are in-phase, no reactive power is being exchanged. Therefore these cases illustrate the ability to control the power factor independently of the power being exchanged between the vehicle and the grid.

FIG. 20 or Case 6, illustrates the boost mode operating case, V2G mode (or equivalently discharge mode), and equal power being delivered to ES1 and to ES2. The charging power is approximately 70 kW and the power factor is equal to 1. The charging power and power factor can be determined by comparing the system voltages with the ac line currents.

Figure 21:
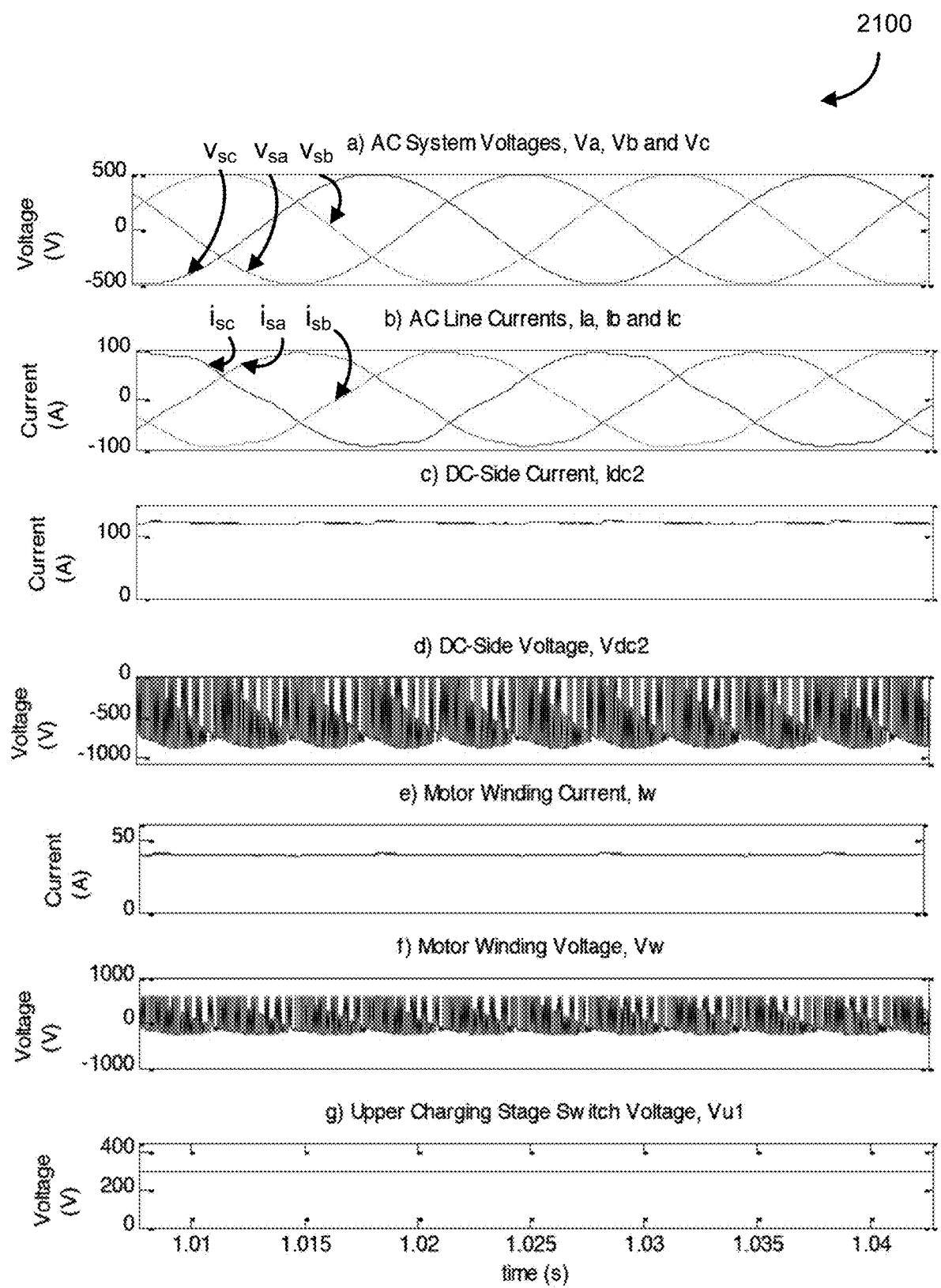
FIG. 21 presents simulation results for Case 7, according to some embodiments. In Case 7 the vehicle is delivering 70 kW of power to the 600 V three-phase grid at unity power factor. The energy storage elements are at 300 V.

FIG. 21 or Case 7, illustrates the buck mode operating case, V2G mode (or equivalently discharge mode), and equal power being delivered to ES1 and to ES2. The charging power is approximately 70 kW and the power factor is equal to 1. The charging power and power factor can be determined by comparing the system voltages with the ac line currents.

In all simulation cases, interleaving of the gating of the switches of VSC 1 with respect to those of VSC 2 which interface the same motor windings is performed. Additionally, the interleaving of the gating of the switches of the phases of VSC1 is performed. Additionally, the interleaving of the gating of the switches of the phases of VSC2 is performed.

ALTERNATE EMBODIMENTS

Single-Phase AC Topology Variant

Figure 22:
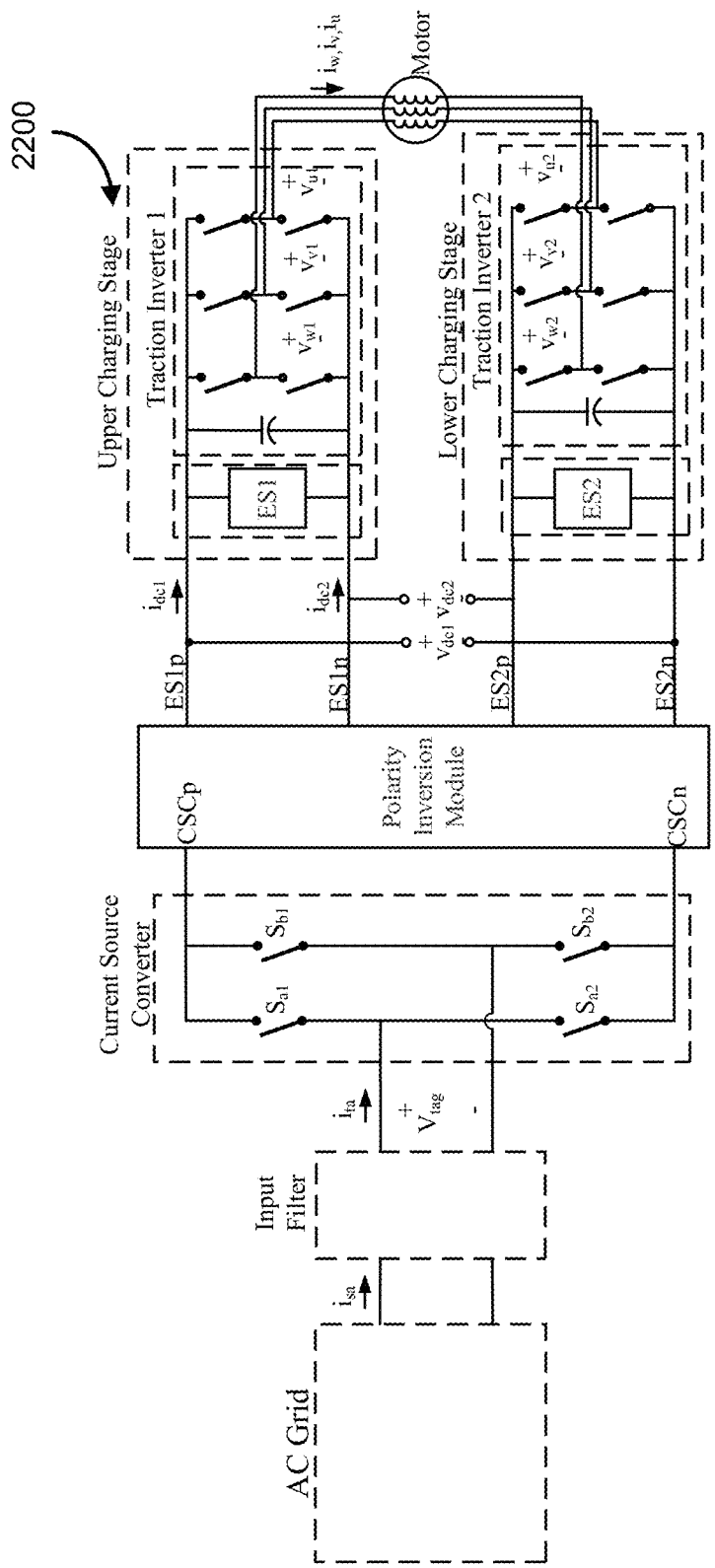
FIG. 22 presents a variation for single-phase AC grid charging applications, according to some embodiments.

An alternate more restricted embodiment allowing only for bidirectional charging from a single phase ac grid is provided in FIG. 22. The CSC only has two phases and 4 switches in this alternate embodiment.

Uni-Directional Topology Variant

An alternate embodiment that is more restrictive, allowing only for uni-directional power flow from the grid to the electric vehicle (i.e. no V2G capability) is presented in FIG. 23. This alternate embodiment is similar to the embodiment of FIG. 3, however, the polarity inversion module has been omitted. Possible implementations of the CSC switches may be involve a combination of IGBT and series diode or alternatively IGCTs, for example.

Bi-Directional Topology Variant with SCR Front-End

The current source converter front-end can also be realized by a silicon controlled rectifier (SCR). This realization would restrict the operating range and would impact the design of the three-phase AC low-pass filter.

An alternate embodiment that is more restrictive, allowing only for uni-directional power flow from the grid to the electric vehicle (i.e. no V2G capability) is presented in FIG. 16. This alternate embodiment is similar to the embodiment of FIG. 3, however, the polarity inversion module has been omitted. Possible implementations of the CSC switches may be involve a combination of IGBT and series diode or alternatively IGCTs, for example.

FIG. 24 is a method diagram of a method 2400 for operating an integrated three-phase ac charger for vehicle applications with dual-inverter drive, according to some embodiments, having steps 2402, 2404, and 2406.

Figure 25:
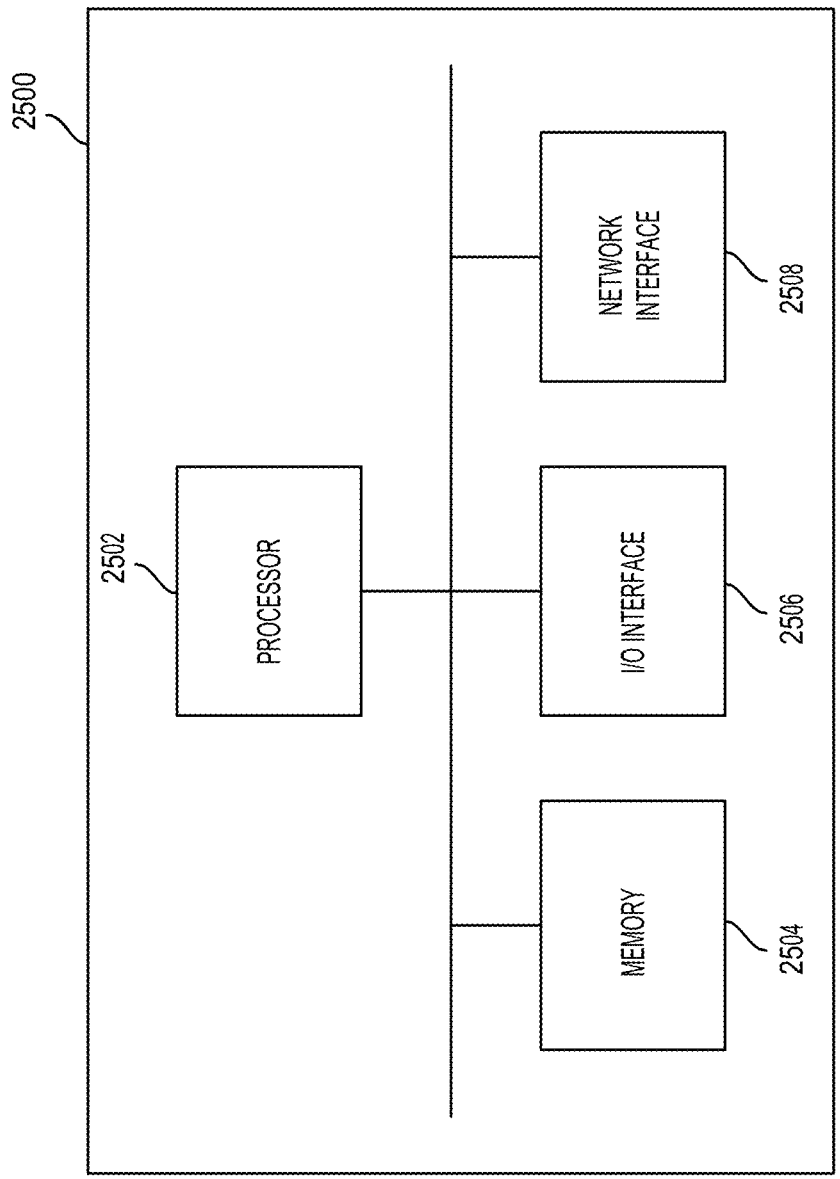
FIG. 25 is a computing device diagram of an example computing device that can be used for controlling gating to implement a method for operating an integrated three-phase ac charger for vehicle applications with dual-inverter drive, according to some embodiments.

FIG. 25 is a computing device diagram of an example computing device 2500 that can be used for controlling gating to implement a method for operating an integrated three-phase ac charger for vehicle applications with dual-inverter drive, according to some embodiments.

The computing device 2500 can include a gating signal controller device that includes a computer processor 2502, a computer memory 2504, an input/output interface 2506, and a network interface 2508. The computing device 2500 can be coupled to the switches described herein to control one or more gating aspects of the switches to control the operation of the switches.

Machine-interpretable instructions may be stored in memory 2504, including switch control sequences, and these may be updated or modified from time to time based on updates received at interfaces 2506 or 2508.

The term "connected" or "coupled to" may include both direct coupling (in which two elements that are coupled to each other contact each other) and indirect coupling (in which at least one additional element is located between the two elements).

Although the embodiments have been described in detail, it should be understood that various changes, substitutions and alterations can be made herein without departing from the scope. Moreover, the scope of the present application is not intended to be limited to the particular embodiments of the process, machine, manufacture, composition of matter, means, methods and steps described in the specification.

As one of ordinary skill in the art will readily appreciate from the disclosure, processes, machines, manufacture, compositions of matter, means, methods, or steps, presently existing or later to be developed, that perform substantially the same function or achieve substantially the same result as the corresponding embodiments described herein may be utilized. Accordingly, the appended claims are intended to include within their scope such processes, machines, manufacture, compositions of matter, means, methods, or steps.

As can be understood, the examples described above and illustrated are intended to be exemplary only.

What is claimed is:

1. A circuit for integrated three-phase AC charging on an electric vehicle or a hybrid-electric vehicle coupled to an AC grid, the circuit comprising:
   a dual inverter drive system including an upper charging stage including a first energy storage and a first voltage source converter (VSC1), a lower charging stage including a second energy storage and a second voltage source converter (VSC2), coupled to a motor coupled between the first voltage source converter and the second voltage source converter, the motor having three or more motor windings each coupled to a corresponding AC terminal of each of the VSC1 and the VSC2;
   a current source converter (CSC) having a set of CSC AC connections for coupling to the AC grid, a set of CSC DC connections, and a plurality of controllable CSC switches which are operable to control an energy flow between the AC grid and the dual inverter drive system through the CSC;
   wherein a leakage inductance of the motor is used to provide an inductance for operating the CSC, and
   wherein a back-emf (Vd) is provided by differentially connecting connections of the dual inverter drive system to the set of CSC DC connections to allow for operation of the circuit in a plurality of operation modes during charging through adjustment of the back-emf Vd by controlling the switches of the VSC1 and VSC2.

2. The circuit of claim 1, wherein the circuit resides within the electric vehicle or the hybrid-electric vehicle and the motor is operable to provide both locomotion and to facilitate the energy flow between the AC grid and the electric vehicle or the hybrid-electric vehicle free of a separate AC/DC conversion circuit when the motor is not being used to provide locomotion, the motor including magnetic components which are utilized both for providing locomotion and facilitating the energy flow.

3. The circuit of claim 2, wherein a controller circuit is configured to toggle operation of the motor between a locomotion state and an energy flow state.

4. The circuit of claim 1, further comprising:
   a polarity inversion circuit coupled between the CSC and the upper charging stage and the dual inverter drive system charging stage, the polarity inversion circuit coupled to the CSC at a positive CSC DC terminal and a negative CSC DC terminal, and the polarity inversion circuit coupled to the upper charging stage at a positive VSC1 DC terminal, and coupled to the lower charging stage at a negative VSC2 DC terminal;
   wherein the polarity inversion circuit is configured to invert a polarity of the back emf provided by the dual inverter drive system such that the electric vehicle or the hybrid-electric vehicle is able to provide power to the AC grid.

5. The circuit of claim 4, wherein the polarity inversion circuit is coupled to the upper charging stage at the negative VSC1 DC terminal and to the lower charging stage at a positive VSC2 DC terminal, and includes at least one switch that interfaces the CSC with the dual inverter drive system, with the polarity inversion circuit having a first state and a second state; the first state coupling the positive CSC DC terminal and the positive VSC1 DC terminal, and coupling the negative CSC DC terminal and the negative VSC2 DC terminal; and a second state coupling the positive CSC DC terminal and the negative VSC1 DC terminal, and coupling the negative CSC DC terminal and the positive VSC2 DC terminal; wherein in the first state, power is directed to the electrical vehicle or the hybrid electric vehicle and in the second state, power is directed to the AC grid.

6. The circuit of claim 4, wherein the polarity inversion circuit includes at least one switch and interfaces the CSC with the dual inverter drive system, the polarity inversion circuit having a first state and a second state of operation; the first state coupling the positive CSC DC terminal and the positive VSC1 DC terminal, and coupling the negative CSC DC terminal and the negative VSC2 DC terminal; and a second state coupling the positive CSC DC terminal and the negative VSC2 DC terminal, and coupling the negative CSC DC terminal and the positive VSC1 DC terminal; wherein the in the first state, power is directed to the vehicle and the in the second state, power is directed to the grid.

7. The circuit of claim 4, where the polarity inversion circuit includes a mechanical switch of double pole single throw type or a switch of double pole double throw type.

8. The circuit of claim 4, wherein the polarity inversion circuit consists of at least four semiconductor switches with each switch of the at least four semiconductor switches coupling one CSC DC terminal to one VSC DC terminal.

9. The circuit of claim 4, wherein each phase of the CSC is associated with two switches, an upper switch corresponding to the phase and a lower switch corresponding to the phase, each of the upper switch and the lower switch corresponding to the phase comprising a first and a second series connected sub-switches with an accessible mid-point, the first sub-switch providing positive voltage blocking capability and the second sub-switch providing negative voltage blocking capability; wherein, the polarity inversion circuit includes a first three phase switch network and a second three phase switch network, with each three phase switch network including at least four switches, three switches for each phase and one master switch that is to controllable; wherein the positive CSC DC terminal and the positive VSC1 DC terminal are electrically bonded, and the negative CSC DC terminal and the negative VSC2 DC terminal are electrically bonded; and wherein the first three phase switch network couples a mid-point of three upper sub-switches to the dual inverter drive system;

wherein the second three phase switch network couples a mid-point of three lower sub-switches to the dual inverter drive system;

wherein the polarity inversion circuit has a first state and a second state: in the first state, the first and second master control switches are controlled to be off and the first and second phase switch network are not active; in the second state, the first and second master control switches are controlled to be on and the first and second phase switch network are active;

wherein in the first state, power is directed to the vehicle; and wherein in the second state, power is directed to the AC grid.

10. The circuit of claim 9, wherein the first three phase switch network is coupled to the negative VSC1 DC terminal, and the second three phase switch network is coupled to the positive VSC2 DC terminal or wherein the first three phase switch network is coupled to the negative VSC2 DC terminal, and the second three phase switch network is coupled to the positive VSC1 DC terminal.

11. A method for integrated three-phase AC charging on an electric vehicle or a hybrid-electric vehicle coupled to an AC grid, the method comprising:

providing a dual inverter drive system including an upper charging stage including a first energy storage and a first voltage source converter (VSC1), a lower charging stage including a second energy storage and a second voltage source converter (VSC2), coupled to an motor coupled between the first voltage source converter and the second voltage source converter, the motor having three or more motor windings each coupled to a corresponding AC terminal of each of the VSC1 and the VSC2;

providing a current source converter (CSC) having a set of CSC AC connections for coupling to the AC grid, a set of CSC DC connections, and a plurality of controllable CSC switches which are operable to control an energy flow between the AC grid and the dual inverter drive system through the CSC; and controlling, through gate control signals, energy flow between the AC grid and the electric vehicle or the hybrid-electric vehicle by operating the CSC and the dual inverter drive system;

wherein a leakage inductance of the motor is used to provide an inductance for operating the CSC, and wherein a back-emf (Vd) is provided by differentially connecting connections of the dual inverter drive system to the set of CSC DC connections to allow for operation of the circuit in a plurality of operation modes during charging through adjustment of the back-emf Vd by controlling the switches of the VSC1 and VSC2.

12. The method of claim 11, wherein the dual inverter drive system and the current source converter are components of a circuit that resides within the electric vehicle or the hybrid-electric vehicle and the motor is operable to provide both locomotion and to facilitate the energy flow between the AC grid and the electric vehicle or the hybrid-electric vehicle free of a separate AC/DC conversion circuit when the motor is not being used to provide locomotion, the motor including magnetic components which are utilized both for providing locomotion and facilitating the energy flow.

13. The method of claim 12, wherein a controller circuit is configured to toggle operation of the motor between a locomotion state and an energy flow state.

14. The method of claim 11, further comprising:

providing a polarity inversion circuit coupled between the CSC and the upper charging stage and the lower charging stage, the polarity inversion circuit coupled to the CSC at a positive CSC DC terminal and a negative CSC DC terminal, and the polarity inversion circuit coupled to the upper charging stage at a positive VSC1 DC terminal, and coupled to the lower charging stage at a negative VSC2 DC terminal; and inverting, by the polarity inversion circuit, a polarity of the back emf provided by the dual inverter drive system such that the electric vehicle or the hybrid-electric vehicle is able to provide power to the AC grid.

15. The method of claim 14, wherein the polarity inversion circuit is coupled to the upper charging stage at the negative VSC1 DC terminal and to the lower charging stage at a positive VSC2 DC terminal, and includes at least one switch that interfaces the CSC with the dual inverter drive system, with the polarity inversion circuit having a first state and a second state; the first state coupling the positive CSC DC terminal and the positive VSC1 DC terminal, and coupling the negative CSC DC terminal and the negative VSC2 DC terminal; and a second state coupling the positive CSC DC terminal and the negative VSC1 DC terminal, and coupling the negative CSC DC terminal and the positive VSC2 DC terminal; wherein in the first state, power is directed to the electrical vehicle or the hybrid electric vehicle and in the second state, power is directed to the AC grid.

16. The method of claim 14, wherein the polarity inversion circuit includes at least one switch and interfaces the CSC with the dual inverter drive system, the polarity inversion circuit having a first state and a second state of operation; the first state coupling the positive CSC DC terminal and the positive VSC1 DC terminal, and coupling the negative CSC DC terminal and the negative VSC2 DC terminal; and a second state coupling the positive CSC DC terminal and the negative VSC2 DC terminal, and coupling the negative CSC DC terminal and the positive VSC1 DC terminal; wherein the in the first state, power is directed to the vehicle and the in the second state, power is directed to the grid.

17. The method of claim 14, where the polarity inversion circuit includes a mechanical switch of double pole single throw type or a switch of double pole double throw type.

18. The method of claim 14, wherein the polarity inversion circuit consists of at least four semiconductor switches with each switch of the at least four semiconductor switches coupling one CSC DC terminal to one VSC DC terminal.

19. The method of claim 14, wherein each phase of the CSC is associated with two switches, an upper switch corresponding to the phase and a lower switch corresponding to the phase, each of the upper switch and the lower switch corresponding to the phase comprising a first and a second series connected sub-switches with an accessible mid-point, the first sub-switch providing positive voltage blocking capability and the second sub-switch providing negative voltage blocking capability; wherein, the polarity inversion circuit includes a first three phase switch network and a second three phase switch network, with each three phase switch network including at least four switches, three switches for each phase and one master switch that is to controllable; wherein the positive CSC DC terminal and the positive VSC1 DC terminal are electrically bonded, and the negative CSC DC terminal and the negative VSC2 DC terminal are electrically bonded; and

- wherein the first three phase switch network couples a mid-point of three upper sub-switches to the dual inverter drive system;
- wherein the second three phase switch network couples a mid-point of three lower sub-switches to the dual inverter drive system;
- wherein the polarity inversion circuit has a first state and a second state: in the first state, the first and second master control switches are controlled to be off and the first and second phase switch network are not active; in the second state, the first and second master control switches are controlled to be on and the first and second phase switch network are active;
- wherein in the first state, power is directed to the vehicle; and
- wherein in the second state, power is directed to the AC grid.

20. A non-transitory machine readable medium storing machine-interpretable instruction sets, which when executed, cause a processor to perform a method for integrated three-phase AC charging on an electric vehicle or a hybrid-electric vehicle coupled to an AC grid, the method comprising:

providing a dual inverter drive system including an upper charging stage including a first energy storage and a first voltage source converter (VSC1), a lower charging stage including a second energy storage and a second voltage source converter (VSC2), coupled to an motor coupled between the first voltage source converter and the second voltage source converter, the motor having three or more motor windings each coupled to a corresponding AC terminal of each of the VSC1 and the VSC2;

providing a current source converter (CSC) having a set of CSC AC connections for coupling to the AC grid, a set of CSC DC connections, and a plurality of controllable CSC switches which are operable to control an energy flow between the AC grid and the dual inverter drive system through the CSC; and controlling, through gate control signals, energy flow between the AC grid and the electric vehicle or the hybrid-electric vehicle by operating the CSC and the dual inverter drive system;

wherein a leakage inductance of the motor is used to provide an inductance for operating the CSC, and wherein a back-emf (Vd) is provided by differentially connecting connections of the dual inverter drive system to the set of CSC DC connections to allow for operation of the circuit in a plurality of operation modes during charging through adjustment of the back-emf Vd by controlling the switches of the VSC1 and VSC2.

* * * * *